US012789225B2

(12) United States Patent
Henry et al.

(10) Patent No.: US 12,789,225 B2
(45) Date of Patent: Nov. 10, 2026

(54) METHODS, DEVICES AND KITS FOR APPLYING STRUCTURAL ADHESIVES

(71) Applicant: 3M INNOVATIVE PROPERTIES COMPANY, St. Paul, MN (US)

(72) Inventors: Andrew R. Henry, Berkshire (GB); Sabeel Ullah, Buckinghamshire (GB); Paul H.R. Jolly, Fareham Hants (GB); Neale F. Griffiths, Buckinghamshire (GB)

(73) Assignee: 3M Innovative Properties Company, St. Paul, MN (US)

( * ) Notice: Subject to any disclaimer, the term of this patent is extended or adjusted under 35 U.S.C. 154(b) by 107 days.

(21) Appl. No.: 18/714,944

(22) PCT Filed: Dec. 7, 2022

(86) PCT No.: PCT/IB2022/061895

§ 371 (c)(1),
(2) Date: May 30, 2024

(87) PCT Pub. No.: WO2023/105448

PCT Pub. Date: Jun. 15, 2023

(65) Prior Publication Data

US 2025/0135489 A1 May 1, 2025

Related U.S. Application Data

(60) Provisional application No. 63/265,206, filed on Dec. 10, 2021.

(51) Int. Cl.

*B05C 17/005* (2006.01)
*B05C 17/01* (2006.01)
(Continued)

(52) U.S. Cl.

CPC .. *B05C 17/00566* (2013.01); *B05C 17/00569* (2013.01); *B05C 17/00583* (2013.01);
(Continued)

(58) Field of Classification Search

CPC ........ B05C 17/00566; B05C 17/00569; B05C 17/00583; B05C 17/0103;
(Continued)

(56) References Cited

U.S. PATENT DOCUMENTS 3,436,359 A 4/1969 Hubin et al.
4,013,509 A 3/1977 Kamatani et al.
(Continued)

FOREIGN PATENT DOCUMENTS

CA 2125920 A1 12/1994
CA 2420578 A1 8/2004
(Continued)

OTHER PUBLICATIONS

Choi, "Development of an Online Monitoring Device for the Mixing Ratio of Two-Part Epoxy Adhesives Using an Electrical Impedance Spectroscopy Technique and Machine Learning", Processes, May 10, 2022, vol. 10, pp. 1-23.
(Continued)

*Primary Examiner* — Donnell A Long
(74) *Attorney, Agent, or Firm* — Vincent Pham

(57) ABSTRACT

A system for dispensing an adhesive, the system including a chamber that holds at least two flexible containment vessels, the at least two flexible containment vessels holding at least a part 1 and a part 2; and at least two adhesive delivery channels, a first adhesive delivery channel connected to the containment vessel to receive part 1 and a second adhesive delivery channel connected to the containment vessel to receive part 2; a 10 motor; at least a first variable positive displacement pump wherein the first vari-
(Continued)

able positive displacement pump is actuated by the motor; and a mixing tip designed to receive part 1 and part 2 from the at least two adhesive delivery channels, mix at least part 1 and part 2 together and dispense the adhesive through a dispensing end.

19 Claims, 11 Drawing Sheets

(51) Int. Cl.
*F04B 13/00* (2006.01)
*F04B 43/12* (2006.01)

(52) U.S. Cl.
CPC .......... *B05C 17/0103* (2013.01); *F04B 13/00* (2013.01); *F04B 43/12* (2013.01)

(58) Field of Classification Search
CPC .... B05C 17/00556; F04B 13/00; F04B 43/12; F04B 17/06; F04B 19/04; F04B 15/02; F04B 43/08; F04B 43/086; B05D 1/26; B05D 1/34
See application file for complete search history.

(56) References Cited

U.S. PATENT DOCUMENTS

| | | | | |
|---|---|---|---|---|
| 4,668,736 | A | 5/1987 | Robins et al. | |
| 4,833,213 | A | 5/1989 | Leir et al. | |
| 5,188,259 | A * | 2/1993 | Petit | B05C 17/0103 222/326 |
| 5,198,146 | A | 3/1993 | Shomer | |
| 5,243,014 | A | 9/1993 | Shomer | |
| 5,314,604 | A | 5/1994 | Friese et al. | |
| 5,337,824 | A | 8/1994 | Cowan | |
| 5,358,044 | A | 10/1994 | Hale et al. | |
| 5,361,841 | A | 11/1994 | Hale et al. | |
| 5,441,049 | A | 8/1995 | Masano | |
| 5,470,896 | A | 11/1995 | Wegmann et al. | |
| 5,746,935 | A | 5/1998 | Corley et al. | |
| 5,780,525 | A | 7/1998 | Ryang et al. | |
| 5,798,409 | A | 8/1998 | Ho | |
| 5,962,629 | A | 10/1999 | Corley et al. | |
| 6,127,508 | A | 10/2000 | Corley et al. | |
| 6,210,972 | B1 | 4/2001 | Williams et al. | |
| 6,258,918 | B1 | 7/2001 | Ho et al. | |
| 6,440,633 | B1 | 8/2002 | Kawauchi et al. | |
| 6,488,180 | B1 | 12/2002 | Bayat | |
| 6,740,704 | B2 | 5/2004 | Konno et al. | |
| 6,844,137 | B2 | 1/2005 | Fujimaki et al. | |
| 6,864,337 | B2 | 3/2005 | Yuasa et al. | |
| 6,939,617 | B2 | 9/2005 | Koide et al. | |
| 7,026,096 | B2 | 4/2006 | Hotta | |
| 7,067,577 | B2 | 6/2006 | Aramaki et al. | |
| 7,321,006 | B2 | 1/2008 | Hayashiya et al. | |
| 7,345,111 | B2 | 3/2008 | Ozawa et al. | |
| 7,718,339 | B2 | 5/2010 | Tomita et al. | |
| 8,021,813 | B2 | 9/2011 | Sato et al. | |
| 8,124,317 | B2 | 2/2012 | Oya et al. | |
| 8,211,519 | B2 | 7/2012 | Obu et al. | |
| 8,383,331 | B2 | 2/2013 | Nakamura et al. | |
| 8,389,187 | B2 | 3/2013 | Kadokura et al. | |
| 8,403,472 | B2 | 3/2013 | Irita | |
| 8,439,480 | B2 | 5/2013 | Kida | |
| 8,519,726 | B2 | 8/2013 | Sun | |
| 8,525,533 | B2 | 9/2013 | Sullivan | |
| 8,528,785 | B2 | 9/2013 | Naughton | |
| 8,603,445 | B2 | 12/2013 | Banowski et al. | |
| 8,653,176 | B2 | 2/2014 | Nakamichi et al. | |
| 8,883,401 | B2 | 11/2014 | Matsuura et al. | |
| 8,892,198 | B2 | 11/2014 | Bohorquez et al. | |
| 8,975,351 | B2 | 3/2015 | Kim et al. | |
| 9,023,568 | B2 | 5/2015 | Kubo et al. | |
| 9,403,188 | B2 | 8/2016 | Rosenkranz et al. | |
| 9,704,724 | B2 | 7/2017 | Fujiwara et al. | |
| 10,004,316 | B2 | 6/2018 | Streeter | |
| 10,960,125 | B2 | 3/2021 | Loderer et al. | |
| 2001/0016706 | A1 * | 8/2001 | Leukanech | F04B 43/08 604/153 |
| 2003/0080152 | A1 | 5/2003 | Balcome et al. | |
| 2004/0176536 | A1 | 9/2004 | Kikuchi et al. | |
| 2006/0009561 | A1 | 1/2006 | Kamoshita et al. | |
| 2006/0223914 | A1 | 10/2006 | Yuasa et al. | |
| 2009/0309615 | A1 | 12/2009 | Reindl et al. | |
| 2010/0188110 | A1 | 7/2010 | Sun | |
| 2010/0260698 | A1 | 10/2010 | Galante et al. | |
| 2011/0200836 | A1 | 8/2011 | Obu et al. | |
| 2012/0020906 | A1 | 1/2012 | Banowski et al. | |
| 2012/0295071 | A1 | 11/2012 | Sato et al. | |
| 2013/0045115 | A1 | 2/2013 | Flachbart et al. | |
| 2014/0080940 | A1 | 3/2014 | Lee et al. | |
| 2017/0354234 | A1 * | 12/2017 | Streeter | A45D 34/041 |
| 2018/0147598 | A1 | 5/2018 | Beckett | |
| 2019/0022614 | A1 | 1/2019 | Krumbein et al. | |
| 2021/0121275 | A1 | 4/2021 | Parham et al. | |
| 2023/0258590 | A1 | 8/2023 | Münstermann et al. | |

FOREIGN PATENT DOCUMENTS

| | | | | |
|---|---|---|---|---|
| CA | 2606043 | A1 | 4/2008 | |
| CA | 2731021 | A1 | 8/2011 | |
| CA | 2803576 | A1 | 4/2012 | |
| CA | 2828693 | C | 2/2018 | |
| CA | 2828934 | C | 12/2018 | |
| CA | 2837855 | C | 1/2021 | |
| DE | 102007063352 | A1 | 7/2009 | |
| DE | 102009002097 | A1 | 10/2010 | |
| DE | 102009029669 | A1 | 3/2011 | |
| DE | 102015207021 | B3 | 6/2016 | |
| EP | 0169066 | B1 | 2/1989 | |
| EP | 0909949 | B1 | 2/2003 | |
| EP | 1391784 | A2 | 2/2004 | |
| EP | 1479742 | A1 | 11/2004 | |
| EP | 1462860 | B1 | 8/2006 | |
| EP | 1775271 | A2 | 4/2007 | |
| EP | 1347706 | B1 | 5/2008 | |
| EP | 2468792 | A1 | 6/2012 | |
| EP | 3670564 | B1 | 9/2021 | |
| EP | 3940377 | A1 | 1/2022 | |
| GB | 2183498 | A * | 6/1987 | B05C 17/00566 |
| GB | 2386691 | B | 12/2003 | |
| JP | H09-165494 | A | 6/1997 | |
| JP | 2001242612 | A | 9/2001 | |
| JP | 2002241507 | A | 8/2002 | |
| JP | 2004098386 | A | 4/2004 | |
| JP | 2010191355 | A | 9/2010 | |
| JP | 4572952 | B2 | 11/2010 | |
| JP | 2010256908 | A | 11/2010 | |
| JP | 2011178033 | A | 9/2011 | |
| JP | 2020094090 | A | 6/2020 | |
| KR | 20070041394 | A | 4/2007 | |
| KR | 102242569 | B1 | 4/2021 | |
| NL | 7604744 | A | 11/1976 | |
| WO | 1993012759 | A1 | 7/1993 | |
| WO | 1996032454 | A1 | 10/1996 | |
| WO | 1997018792 | A1 | 5/1997 | |
| WO | 2000073367 | A1 | 12/2000 | |
| WO | 2002033004 | A1 | 4/2002 | |
| WO | 2002053611 | A1 | 7/2002 | |
| WO | 2003042316 | A1 | 5/2003 | |
| WO | 2004029168 | A1 | 4/2004 | |
| WO | 2004099100 | A1 | 11/2004 | |
| WO | 2005066095 | A1 | 7/2005 | |
| WO | 2005087684 | A1 | 9/2005 | |
| WO | 2006028008 | A1 | 3/2006 | |
| WO | 2006086041 | A2 | 8/2006 | |
| WO | 2006107069 | A1 | 10/2006 | |
| WO | 2007021840 | A2 | 2/2007 | |
| WO | 2007026936 | A1 | 3/2007 | |
| WO | 2007105737 | A1 | 9/2007 | |
| WO | 2008084512 | A1 | 7/2008 | |
| WO | 2008084802 | A1 | 7/2008 | |
| WO | 2009041500 | A1 | 4/2009 | |

(56) References Cited

FOREIGN PATENT DOCUMENTS

| | | | |
|---|---|---|---|
| WO | 2009110263 | A1 | 9/2009 |
| WO | 2010035955 | A2 | 4/2010 |
| WO | 2010039614 | A2 | 4/2010 |
| WO | 2010150913 | A1 | 12/2010 |
| WO | 2011029680 | A1 | 3/2011 |
| WO | 2011031399 | A1 | 3/2011 |
| WO | 2011031429 | A1 | 3/2011 |
| WO | 2011037005 | A1 | 3/2011 |
| WO | 2011075216 | A1 | 6/2011 |
| WO | 2011081023 | A1 | 7/2011 |
| WO | 2012057233 | A1 | 5/2012 |
| WO | 2012105239 | A1 | 8/2012 |
| WO | 2013090136 | A2 | 6/2013 |
| WO | 2013099785 | A1 | 7/2013 |
| WO | 2013154785 | A1 | 10/2013 |
| WO | 2014058527 | A1 | 4/2014 |
| WO | 2014186032 | A1 | 11/2014 |
| WO | 2015001061 | A1 | 1/2015 |
| WO | 2015026355 | A1 | 2/2015 |
| WO | 2016012567 | A1 | 1/2016 |
| WO | 2016165910 | A1 | 10/2016 |
| WO | 2018138518 | A1 | 8/2018 |
| WO | 2019013917 | A1 | 1/2019 |
| WO | 2019231694 | A1 | 12/2019 |
| WO | 2022013786 | A1 | 1/2022 |
| WO | 2022264065 | A2 | 12/2022 |
| WO | 2023105449 | A2 | 6/2023 |
| WO | 2023105451 | A1 | 6/2023 |
| WO | 2023107667 | A1 | 6/2023 |

OTHER PUBLICATIONS

Festo Website, Retrieved online on Mar. 2022, URL: <https://web.archive.org/web/20220322020354/https://www.festo.com/de/de/>, 5 pages.

International Search Report for PCT Application No. PCT/IB2022/061895, mailed on Mar. 14, 2023, 4 pages.

International Search Report for PCT Application No. PCT/IB2022/061896 mailed on Apr. 3, 2023, 5 pages.

International Search Report for PCT Application No. PCT/IB2022/061902, mailed on Apr. 5, 2023, 5 pages.

International Search Report for PCT Application No. PCT/US2022/052343 mailed on Mar. 28, 2023, 3 pages.

Pena "Anomaly Detection Using Forecasting Methods ARIMA and HWDS", 2013, Proceedings of the 32nd International Conference of the Chilean Computer Science Society, pp. 63-66.

Prominent, "Magnetic Diaphragm Metering Pumps", Retrieved online on Nov. 2023, URL: <https://web.archive.org/web/20231130053540/https://www.prominent.de/de/Produkte/Produkte/Dosierpumpen/Magnet-Membrandosierpumpen/pg-solenoid-driven-metering-pumps.html>, 5 pages.

* cited by examiner

METHODS, DEVICES AND KITS FOR APPLYING STRUCTURAL ADHESIVES

CROSS REFERENCE TO RELATED APPLICATIONS

This application is a national stage filing under 35 U.S.C. 371 of PCT/IB2022/061895, filed Dec. 7, 2022, which claims the benefit of U.S. Provisional Application No. 63/265,206, filed Dec. 10, 2021, the disclosure of which is incorporated by reference in its/their entirety herein.

SUMMARY

The standard approach to providing structural adhesives to customers today is to provide a fairly vast array of structural adhesives that have very specifically chosen properties based on relatively precise requirements provided by the customer. This approach results in a very large amount of specific multipart structural adhesives in inventories (which requires more room for inventories of products, knowledge about which adhesive number provides which properties, more cost, more types, etc.), the need to verify and qualify properties on a large number of specific structural adhesives, the need for customers to understand slight differences in the specific structural adhesives within a portfolio of structural adhesives, etc. Therefore, there remains a need for a basic rethinking of how structural adhesives can be provided to customers.

Disclosed herein are systems and devices for dispensing adhesives.

Disclosed herein are systems for dispensing an adhesive, the system comprising: a chamber that holds at least two flexible containment vessels, the at least two flexible containment vessels holding at least a part 1 and a part 2; at least two adhesive delivery channels, a first adhesive delivery channel connected to the containment vessel to receive part 1 and a second adhesive delivery channel connected to the containment vessel to receive part 2; a motor; at least a first variable positive displacement pump wherein the first variable positive displacement pump is actuated by the motor; and a mixing tip designed to receive part 1 and part 2 from the at least two adhesive delivery channels, mix at least part 1 and part 2 together and dispense the adhesive through a dispensing end, wherein when in operation, the at least part 1, part 2, or mixtures thereof are only in contact with the at least two flexible containment vessels, the at least two adhesive delivery channels and the mixing tip, wherein the at least one variable positive displacement pump forces the at least part 1 and at least part 2 respectively through the first adhesive delivery channel and the second adhesive delivery channel to the dispensing end of the mixing tip.

Disclosed herein are kits for dispensing multipart structural adhesives, the kit comprising: a system according to any of the preceding Embodiments; and at least a first flexible containment vessel holding a Part 1 composition and a second flexible containment vessel holding a Part 2 composition of a multipart structural adhesive, wherein the amounts, ratios, or both of the Part 1 and the Part 2 are controlled by the dispenser, and wherein the amounts, ratios, or both of the Part 1, and the Part 2 affect one or more properties of the multipart structural adhesive composition.

The methods, systems and devices disclosed herein can be utilized to impact one or more of a multitude of different properties, including for example, work life, pot life, rate of strength build up, structural strength, overlap shear strength, adhesion, elongation, creep resistance, impact resistance, temperature performance, moisture resistance, color, and other physical properties.

Throughout this disclosure, singular forms such as “a,” “an,” and “the” are often used for convenience; however, the singular forms are meant to include the plural unless the singular alone is explicitly specified or is clearly indicated by the context. When the singular alone is called for, the term “one and only one” is typically used.

Terms indicating a high frequency, such as (but not limited to) “common,” “typical,” and “usual,” as well as “commonly,” “typically,” and “usually” are used herein to refer to features that are often employed in the disclosure and, unless specifically used with reference to the prior art, are not intended to mean that the features are present in the prior art, much less that those features are common, usual, or typical in the prior art.

Herein, the term “comprises” and variations thereof do not have a limiting meaning where these terms appear in the description and claims. Such terms will be understood to imply the inclusion of a stated step or element or group of steps or elements but not the exclusion of any other step or element or group of steps or elements. By “consisting of” is meant including, and limited to, whatever follows the phrase “consisting of.” Thus, the phrase “consisting of” indicates that the listed elements are required or mandatory, and that no other elements may be present. By “consisting essentially of” is meant including any elements listed after the phrase and limited to other elements that do not interfere with or contribute to the activity or action specified in the disclosure for the listed elements. Thus, the phrase “consisting essentially of” indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words “preferred” and “preferably” refer to embodiments of the disclosure that may afford certain benefits, under certain circumstances. However, other claims may also be preferred, under the same or other circumstances. Furthermore, the recitation of one or more preferred claims does not imply that other claims are not useful and is not intended to exclude other claims from the scope of the disclosure.

As used herein, the term “or” is generally employed in its usual sense including “and/or” unless the content clearly dictates otherwise. The term “and/or” means one or all of the listed elements or a combination of any two or more of the listed elements.

Also herein, all numbers are assumed to be modified by the term “about” and in certain embodiments, preferably, by the term “exactly.” As used herein in connection with a measured quantity, the term “about” refers to that variation in the measured quantity as would be expected by the skilled artisan making the measurement and exercising a level of care commensurate with the objective of the measurement and the precision of the measuring equipment used. Herein, “up to” a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

The term "in the range" or "within a range" (and similar statements) includes the endpoints of the stated range.

As used herein, the term "room temperature" refers to a temperature of about 20° C. (68° F.) to about 25° C. (77° F.) or about 22° C. (71.6° F.) to about 25° C. (77° F.).

As used herein the term "negative pressure" refers to the lowering of the pressure relative to, the pressure previously existing or the pressure of the surrounding environment; for instance, lowering the pressure on one end of a tube would cause the movement of the tube contents from the higher pressure end of the tube to the end with the lowered pressure.

Groupings of alternative elements or embodiments disclosed herein are not to be construed as limitations. Each group member may be referred to and claimed individually or in any combination with other members of the group or other elements found therein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION

Figure 1:
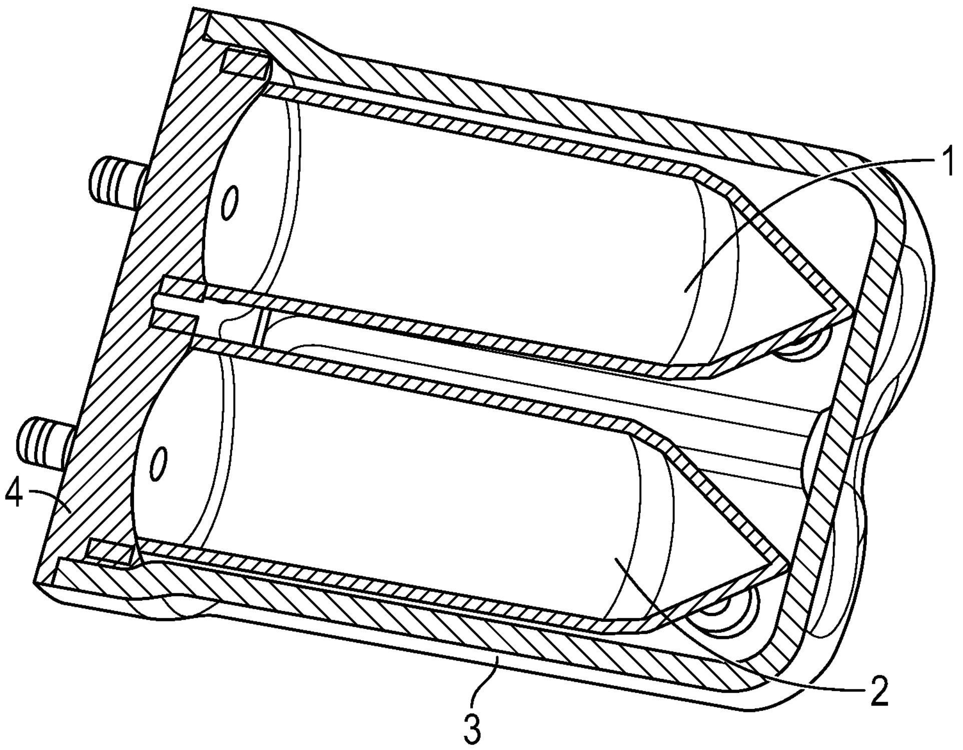
FIG. 1 is a cross sectional view of a disclosed chamber that includes two flexible containment vessels.

This invention describes methods, devices, and kits for applying and using structural adhesives. Traditional methods of manual application use hand-held "Dispensing Guns" which can accommodate a variety of different adhesive cartridge sizes. The smaller adhesive cartridges (e.g., 50 to 200 ml) tend to use human powered mechanisms to push the adhesive component(s) through nozzles which also can include the ability to mix separate adhesive elements to the point where the user applies the adhesive. For larger cartridge sizes (e.g., 200 to 600 ml) powered mechanisms are typically used which tend to be either pneumatic or battery powered to drive the adhesive being dispensed. These systems have limited control and the dispensing outcome is fundamentally down to the skill of the operator. The larger powered "Dispensing Guns" are also physically challenging to use and are often very bulky and heavy which make them difficult to use for long periods for many users.

This disclosure discloses a chamber that houses flexible containment vessels for at least two (but optionally more) components of an adhesive for a handheld dispenser that enables the adhesive components(s) to be mixed and the release of the adhesive applied without the use of complex and bulky mechanical drive systems. It also considers the possibility of reversing the flow of material into the storage system such that it could potentially offer the option of a reusable vessel(s).

By reducing the bulk and mass of the adhesive storage system due to the inclusion of the pressurized design, the ergonomics for the user may be significant improved by eliminating the need for restrictive pneumatic supply airlines and/or complex mechanical piston drive systems. Additionally, the ability to refill the flexible containment vessels enables the potential for a significant reduction in its environmental footprint.

Typically to pump high viscosity liquids in a peristaltic (traditional rotational or linear) system, the following methods would be employed: the stiffness of the tube wall would be increased to increase the recovery force (this also increases torque requirements); the pump rotation would be slowed to allow recovery of the tube (limits pumping rate); or the roughness of the inner pipe would be decreased (most pipes are very smooth anyway). Each of these methods have drawbacks which limit the application of a low-cost energy efficient handheld adhesive dispenser.

Handheld Dispensing System

Systems as disclosed herein include at least two flexible containment vessels (which can be referred to as a first and a second containment vessel for the sake of convenience and clarity) holding at least a part 1 and a part 2. In some embodiments, additional flexible containment vessels holding additional parts can also be utilized. The flexible containment vessels can be made of any suitable material. A suitable material would be one that can contain the relevant composition and offers the ability to transfer the pressure within the chamber to the composition contained within the flexible containment vessel necessary for use in the disclosed device. Useful materials can include lightweight flexible laminates which may additionally contain structural layers, layers to reduce moisture transmission or to be resistant to ultraviolet (UV) rays in order to extend the useable life of the adhesive elements inside the containment vessels.

The specific material(s) that is chosen can depend at least in part on the adhesive being packaged. For example, some acrylic adhesives require oxygen for the stabilizer chemistry to work in order to provide desirable shelf lives, for example. In such circumstances, the package may have to have a desired level or range of oxygen permeability. As another example, some of the components in an acrylic adhesive can diffuse through packaging material that would be workable for an epoxy or urethane adhesive, for example.

Illustrative materials for the at least two flexible containment vessels can include, for example high density polyethylene (HDPE), polypropylene (PP), polyamide (PA), Nylon, polyethylene terephthalate (PET), polybutylene terephthalate (PBT), co-extrusion of ethylene-vinyl alcohol copolymer (EVOH) with another polymer, thermoplastic polyurethane (TPU), metalized polypropylene, metalized polyethylene terephthalate (PET), metalized polyester, aluminum films, and coated foils. Additional materials may also include uncoated metals and coated metals (both uncoated and coated metals may both be classified UN 1A2/Y/100/ . . . ) that may include an inner-liner made from PP, polyvinyl chloride (PVC), or combinations thereof. Additionally, materials may be powder coated for use with certain formulations.

In some embodiments, polyethylene or polypropylene materials may be utilized.

In some embodiments, a clear multilayer polymer film made by extrusion can be utilized. Specific, selected compositions can include polyamide/polyethylene (PA/PE) bilayer films having thicknesses from 120 to 130 μm can be useful. Such films can be suitable for the packaging of polyurethane resins (polyol/isocyanate). Such films may provide the resistance against any possible impacts of polyols and isocyanates.

In some embodiments, a co-extruded film that includes a first nylon layer (e.g., a 1.35 mil nylon layer) and a second linear low-density polyethylene (LLDPE) layer (e.g., a 3.15 mil LLDPE) can be utilized. In some embodiments, a PA/polyethylene (PE) bilayer film (e.g., 125 μm) can be utilized. In some embodiments, a PA/PE coextruded layer film (e.g., 130 μm having eleven (11) layers) can be utilized.

Useful flexible containment vessels may have different sizes and shapes, which may be able to hold different volumes of material, depending on the final requirements and configuration of the dispensing system they are connected to. The shape of the flexible containment vessels can depend at least in part on the device or system in which they are intended to be used. In some embodiments, useful flexible containment vessels can be tubular in shape. In some embodiments, two different size flexible containment vessels can be utilized in one dispensing system or device. In some embodiments, useful flexible containment vessels can hold from 1000 mL to 10 mL, 800 mL to 25 mL, or even 600 mL to 50 mL for example.

The at least two flexible containment vessels can connect (e.g., directly) to at least two adhesive delivery channels (each flexible containment vessel connects to its own adhesive delivery channel) or one or more outlet manifolds of a chamber. In some embodiments where the at least two flexible containment vessels connect to its own adhesive delivery channel, the flexible containment vessel and its respective adhesive delivery channel can be co-continuous in that they can be made from, e.g., extrusion molded, from a single (or multiple) material(s), or can be made separately (from the same or different materials) and can be connected by a user.

In some embodiments, each flexible containment vessel will have a single outlet that is configured to be accepted by an outlet manifold of a chamber. The chamber is configured to hold the at least two flexible containment vessels. FIG. 1 shows an illustrative example of a chamber 3 that houses a first flexible containment vessel 1 and a second flexible containment vessel 2. The chamber 3 also includes an outlet manifold 4. The particular shape and configuration of the chamber is at least somewhat dependent on the shape and configuration of the flexible containment vessels as well as how many flexible containment vessels it is configured to hold. The illustrative chamber 3 in FIG. 1 is configured to hold two flexible containment vessels, but disclosed devices are in no way intended to be limited to use with only two flexible containment vessels. The outlet manifold 4 is fluidly connected to the outlets of the at least first and second flexible containment vessels once the first and second flexible containment vessels are loaded into the chamber.

In embodiments where the at least two flexible containment vessels connect to at least two adhesive delivery channels, at least some portion of the adhesive delivery channels may be contained in the chamber. In embodiments where the at least two flexible containment vessels connect to at least two adhesive delivery channels, a chamber may have a substantially open end where the adhesive delivery channels exit.

In embodiments where the at least two flexible containment vessels connect to an outlet manifold of the chamber, the outlet manifold may be disposable, may be able to be cleaned by a user, or both. In some embodiments where the at least two flexible containment vessels connect to an outlet manifold of the chamber, the chamber may be disposable.

Disclosed systems or devices that utilize disclosed flexible containment vessels allow separate parts of an adhesive to be stored separately in individual flexible containment vessels and then loaded into the chamber that includes an optional connecting manifold or connecting adhesive delivery channels to link the contents of the flexible containment vessels to a pump/metering element of a disclosed adhesive dispensing system. The configuration of the flexible containment vessels, chamber and outlet manifold contribute to enabling a lightweight system or device that can function as a portable handheld dispensing system.

Figure 2:
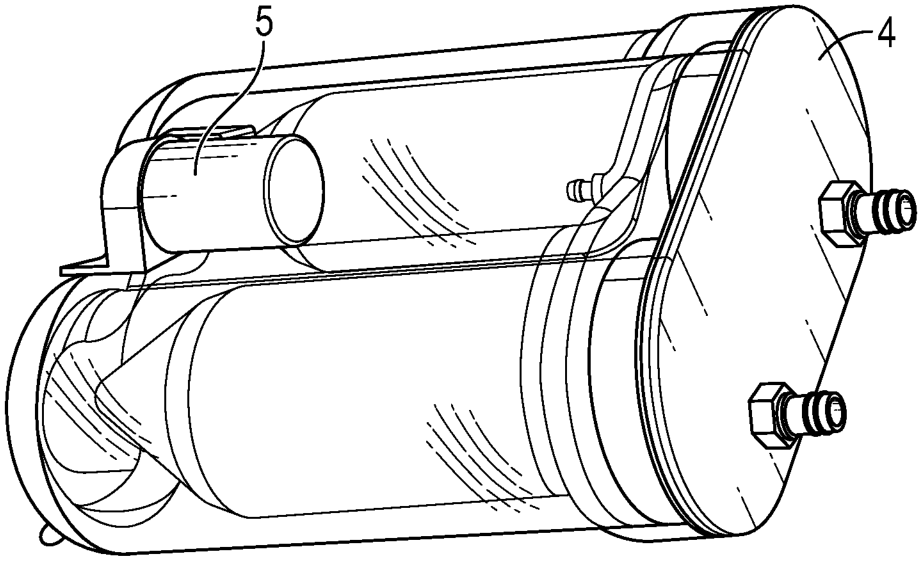
FIG. 2 is a perspective view of a disclosed chamber that includes two flexible containment vessels.

The system or device may also include a compressive element configured to apply external positive pressure to the at least two flexible containment vessels in the chamber to force the contents from the at least two flexible containment vessels through the optional outlet manifold or into the connecting adhesive delivery channels. In some embodiments, use of the optional compressive element may only be necessary or desired in embodiments where high viscosity materials are present in one or more of the flexible containment vessels. FIG. 2 shows a chamber having an outlet manifold 4 and including an external compressive element 5.

The compressive element may be configured to apply uniform pressure over the entire surfaces of the at least two flexible containment vessels. By applying a uniform pressure over the entire flexible containment vessel, the viscous components therein can be gently squeezed through the optional outlet manifold or to the connecting adhesive delivery channel to the next pumping/metering stage. The amount of pressure applied, and outlet manifold or adhesive delivery channel dimensions can be tailored such that the next stage in the dispensing system does not need to generate negative pressure to meter and flow the viscous components. This can be achieved by using pressure transducers to control and maintain correct pressures in the system during use. In some embodiments, useful compressive elements have a linear relationship of flow rate (e.g., milliliters (mL) per second(s) (mL/s) versus pressure in Pascals (Pa).

An advantage of using this pressurized system is that it will require lower power to drive the pumping system compressor element. The system may also use low pressure gas (air) which may minimize safety concerns over construction and control if high pressures were used. The design also need not be bulky, heavy or have complex mechanical drive mechanisms to cause the viscous materials to flow and therefore enable a handheld version of a dispensing system allowing disclosed devices to be smaller, lighter and more ergonomic to use. Use of the external compressive element generally provides a consistent flow rate (mL/s) versus dispensed volume (e.g., mL) through the entire contents of the flexible containment vessel, thereby assuring the next stage of the pumping/metering system a stable input of material.

Another advantage of using the compressive element is that the flexible containment vessels could be refilled and reused. In some embodiments, reversal of the pressure applied via the compressive element could be utilized (e.g., in a separate system) to refill the flexible containment vessels from a bulk system. In some embodiments, reversal of the pumps/motors can be utilized to re-inflate or refill a flexible containment vessel to push material back into it. In some embodiments, the mixing tip (discussed below) can be removed and the flexible containment vessels can be refilled from a separate external container containing the component of the multipart adhesive. In some such refillable embodiments, the flexible containment vessels could even be maintained in place in the application device. Such uses would reduce cartridge waste and provide the possibility of multiple re-uses to reduce the environmental impact of the overall adhesive system.

The flexible containment vessels may also be surrounded by a collapsible structure within the chamber that assists in controlling the collapse and encourages removal of the entire contents of the flexible containment vessels.

Disclosed systems also include an adhesive delivery channel for each flexible containment vessel. Inclusion of an adhesive delivery channel in disclosed systems minimizes the number of surfaces within the system that come into contact with the materials from the at least two flexible containment vessels, an adhesive formed by mixing the materials from the at least two flexible containment vessels, or both. Specifically, use of adhesive delivery channels can ensure that materials from the flexible containment vessel, adhesive formed by mixing said materials or both don't come into contact with any of the mechanical pump components. As such, the portion of the system irrespective of the flexible containment vessels are reusable and do not need to be cleaned (e.g., remove adhesive or adhesive components from surfaces of the application device) or replaced before reuse or when switching from one adhesive or component thereof to another. Adhesive delivery channels can be made of any useful material, including for example various polymeric materials. In some embodiments, the at least two adhesive delivery channels can be made of materials that are the same as or similar to those that make up the flexible containment vessels. In some embodiments, the at least two adhesive delivery channels can be made of materials that are substantially different than those that make up the flexible containment vessels.

Illustrative materials for the at least two adhesive delivery channels can include, for example high density polyethylene (HDPE), polypropylene (PP), polyamide (PA), Nylon, polyethylene terephthalate (PET), polybutylene terephthalate (PBT), co-extrusion of ethylene-vinyl alcohol copolymer (EVOH) with another polymer, thermoplastic polyurethane (TPU), metalized polypropylene, metalized polyethylene terephthalate (PET), metalized polyester, aluminum films, and coated foils. Additional materials may also include uncoated metals and coated metals (both uncoated and coated metals may both be classified UN 1A2/Y/100/ . . . ) that may include an inner-liner made from PP, polyvinyl chloride (PVC), or combinations thereof. Additionally, materials may be powder coated for use with certain formulations.

In some embodiments, polyethylene or polypropylene materials may be utilized.

In some embodiments, a clear multilayer polymer film made by extrusion can be utilized. Specific, selected compositions can include polyamide/polyethylene (PA/PE) bilayer films having thicknesses from 120 to 130 μm can be useful. Such films can be suitable for the packaging of polyurethane resins (polyol/isocyanate). Such films may provide the resistance against any possible impacts of polyols and isocyanates.

In some embodiments, a co-extruded film that includes a first nylon layer (e.g., a 1.35 mil nylon layer) and a second linear low-density polyethylene (LLDPE) layer (e.g., a 3.15 mil LLDPE) can be utilized. In some embodiments, a PA/polyethylene (PE) bilayer film (e.g., 125 μm) can be utilized. In some embodiments, a PA/PE coextruded layer film (e.g., 130 μm having eleven (11) layers) can be utilized.

In some embodiments, adhesive delivery channels do not need to prevent the components of the flexible containment vessel or an adhesive formed therefrom from coming into contact with the pump if the pump is a simple, low cost pump. Illustrative pumps can be manufactured from injection molded components, for example. Pumps manufactured from injection molded components could also be utilized in systems where the adhesive delivery channel does not prevent the materials from the flexible containment vessel, an adhesive formed therefrom, or both from coming into contact with the pump or portions thereof.

In some embodiments, the at least two adhesive delivery channels can include at least first and second tubes where the at least two adhesive delivery channels are in contact with at least a portion of the pump. In some embodiments, the relative ratios of the inner diameters of at least the first and second tubes can be changed to allow for different ratios of materials from the at least first and second flexible containment vessels respectively. In some embodiments, even though they allow for different ratios of materials, the wall thickness of the first and second tubes are constant.

In some embodiments, the entire fluid pathway, which includes both the adhesive delivery channels as well as the pathway once the two components are mixed, is self-contained with no direct contact between the pump components and the materials. In such embodiments, the pathway that runs through the pump is intended to form part of a low-cost disposable (or reusable via cleaning, for example) packaging of the adhesive components. In some embodiments, the other components of the fluid pathway include at least two (two in the case of a first and second flexible containment vessels) tubes (e.g., silicone or a similar material) upon which the pump acts on. Loading the at least two flexible containment vessels as well as the other components of the fluid pathway into the system or dispenser can be made relatively simple. In some embodiments, a hinged door (or cap) can be opened to allow access to the tubing, which can then be removed or inserted.

Disclosed systems also include at least one motor. In some embodiments, disclosed systems can include a single motor, and, in some embodiments, disclosed systems can include more than one motor. In some embodiments, disclosed systems can include one motor per pump and in some embodiments, more than one pump can be run by a single motor. In some embodiments, utilization of a motor for each flexible containment vessel can provide a system that offers the advantage of continuously variable control of the components. For example, one motor can be configured to run multiple pumps using multiple gear box(es). In some embodiments, at least four components can be run using a single motor by using three gear boxes for example. In some embodiments, useful motors can include direct current (DC) gearmotors. In some embodiments, one motor can control the pumping and mixing of materials from two flexible containment vessels to form an adhesive.

Disclosed systems also include at least a first pump that is actuated by the at least one motor. In some embodiments, the pump can be a variable positive displacement pump. Useful types of variable positive displacement pumps can include for example rotary peristaltic pumps, linear peristaltic pumps, rotary lobe pumps, progressive cavity pumps, rotary gear pumps, piston pumps, diaphragm pumps, screw pumps, gear pumps, hydraulic pumps, and rotary vane pumps.

In some embodiments, disclosed herein is a peristaltic pumping system that is designed for accurate dispensing of high viscosity fluids (e.g., adhesives) in a relatively low-cost package where in some embodiments, the fluid does not contact the mechanical components allowing quick and safe swapping of the liquid (e.g., the components as well as adhesives formed thereby) with no cleaning. Such systems may be particularly suited to high viscosity adhesives but could also have applications within other markets including wound care, dental and automatic aftermarkets for example. The dispensing system can be incorporated into an electric hand dispenser or robotic application system where the cost of the dispenser needs to be low and/or the fluid needs to be changed regularly (as there is no contact with the fluid and hence no cleaning required).

Additional advantages of using these types of peristaltic pumps can include, for example, they are self-priming, they can dispense fluids having broad ranges of viscosities, the output of the pumps are proportional to rotations, they have a relatively compact size, there will be a relatively low volume of adhesive left in the pump at the end of the life of the flexible containment vessels (thereby leading to lower wasted amounts), they can generate good pressures and the capability to hold such pressures, they can operate in forward and reverse, at rest the fluid pathway is occluded (which may prevent or at least minimize oozing of adhesive at the end of a dispense operation), or any combinations thereof.

Figure 3:
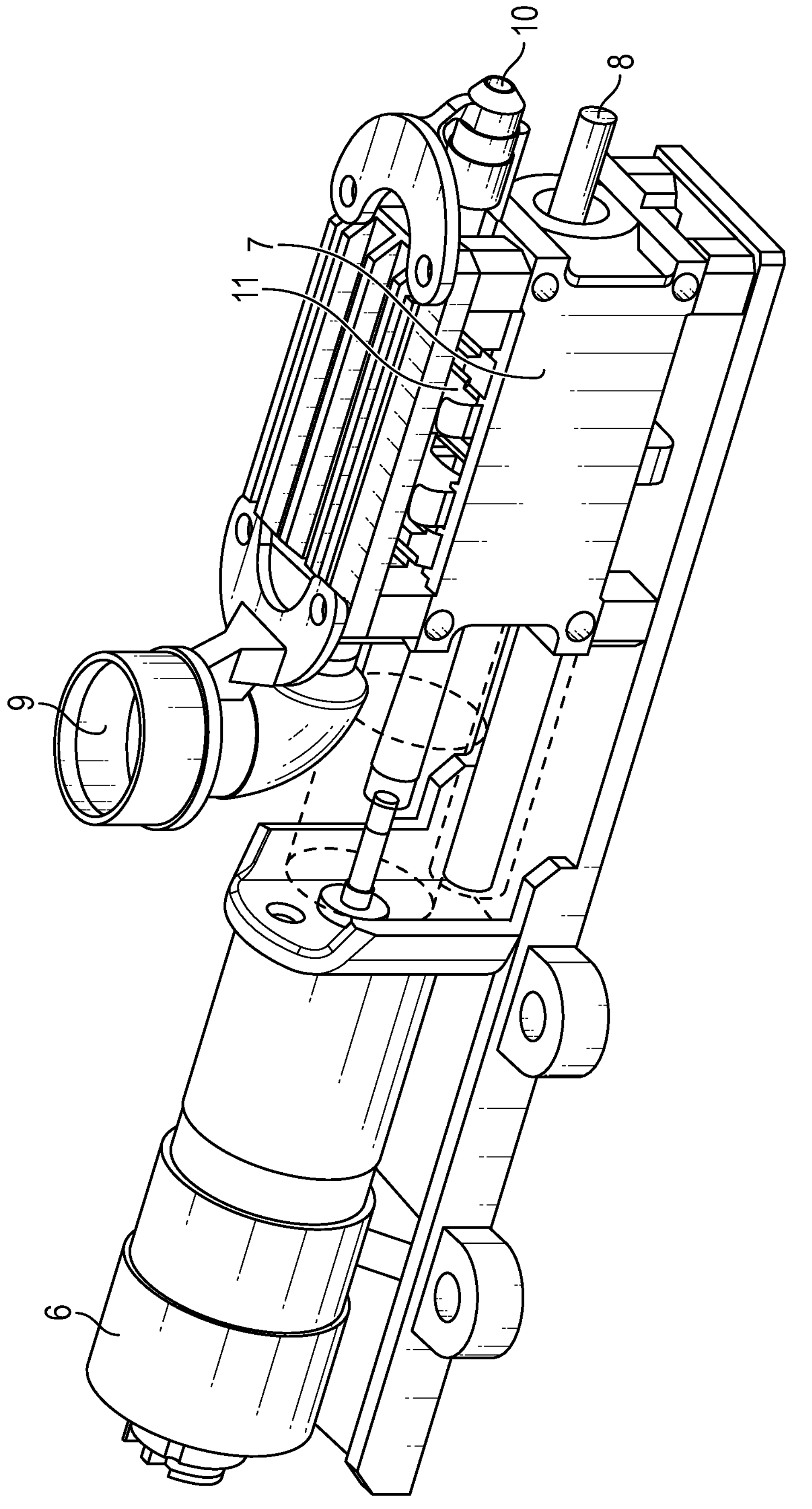
FIG. 3 is a perspective view of a portion of a disclosed device that includes a single motor and a single pump.

FIG. 3 shows some of the components of an illustrative embodiment of disclosed systems. The system includes a motor 6, for example a DC gear motor a fluid inlet 9 (to which the outlet manifold of the chamber and therefore the material from the at least first and second flexible containment vessel would be fluidly connected), a pump 7 that in the illustrated case includes a linear peristaltic pump having disks 11 surrounding a drive shaft 8 and a fluid outlet 10. FIG. 3 illustrates only a single component entering the fluid inlet for the sake of simplicity. In such an embodiment, the component from the first flexible containment vessel would have already been combined before entering the fluid inlet 9. It will be understood that even though FIG. 3 only illustrates a single component, an additionally flexible containment vessel can be utilized in the illustrated system. In such an illustrated system, the drive shaft 8 runs all the way through the pump 7 for connection to a dynamic mixer (not pictured). The disks 11 are configured to depress onto a peristaltic tube that makes up part of the adhesive delivery channel. This embodiment also depicts a coupler 3 between the motor and the pump which is optional.

In some embodiments, the components of useful pumps can be injection molded, three-dimensionally (3D) printed then assembled or can be commercially obtained. In some embodiments systems can include at least one linear peristaltic pump.

Linear peristaltic pumps function, whereby a flexible resilient tube is collapsed along the working length to push out fluid within the tube, and during recovery to draw in the next portion of fluid. Linear peristaltic pumps can include a cam shaft that is configured to be driven by the at least one motor through the center of a housing that rotates to actuate moving elements that drive the material of the at least first and second flexible containment vessels. In embodiments where only one peristaltic pump is utilized to pump materials from two flexible containment vessels (for the sake of example only), the pump and the tubing through the pump may be configured so that opposite sides of the disks that make up the pump act on the two tubes respectively. More specifically, for example, a system may be configured so that a first tube is acted upon by the top of the disks that are within the pump and a second tube is acted upon by the bottom of the disks that are within the pump.

Figure 4A:
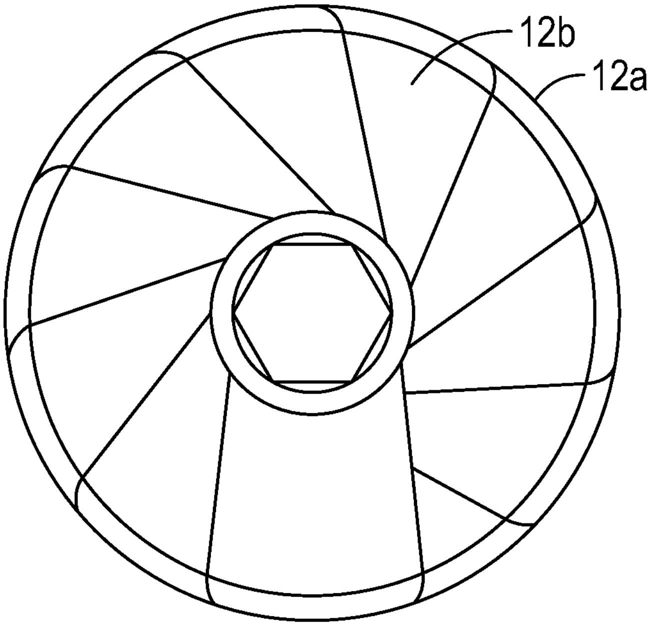
FIGS. 4A, 4B, and 4C are an end on view (FIG. 4A) of the camshaft in an illustrative linear peristaltic pump; a perspective view (FIG. 4B) of the camshaft; and a cut out view (FIG. 4C) of the camshaft and disks in the housing of the illustrative linear peristaltic pump.
Figure 4B:
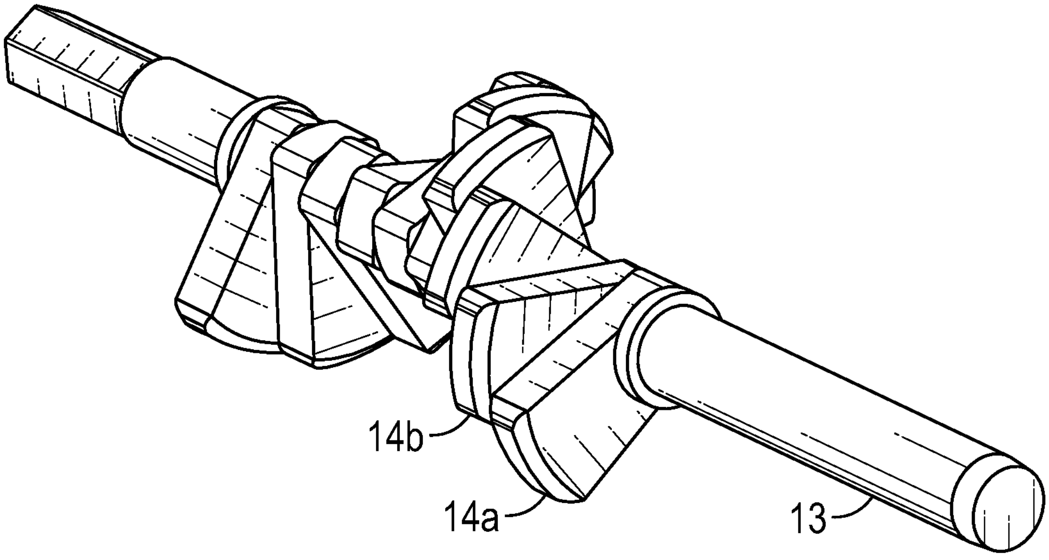
Figure 4C:
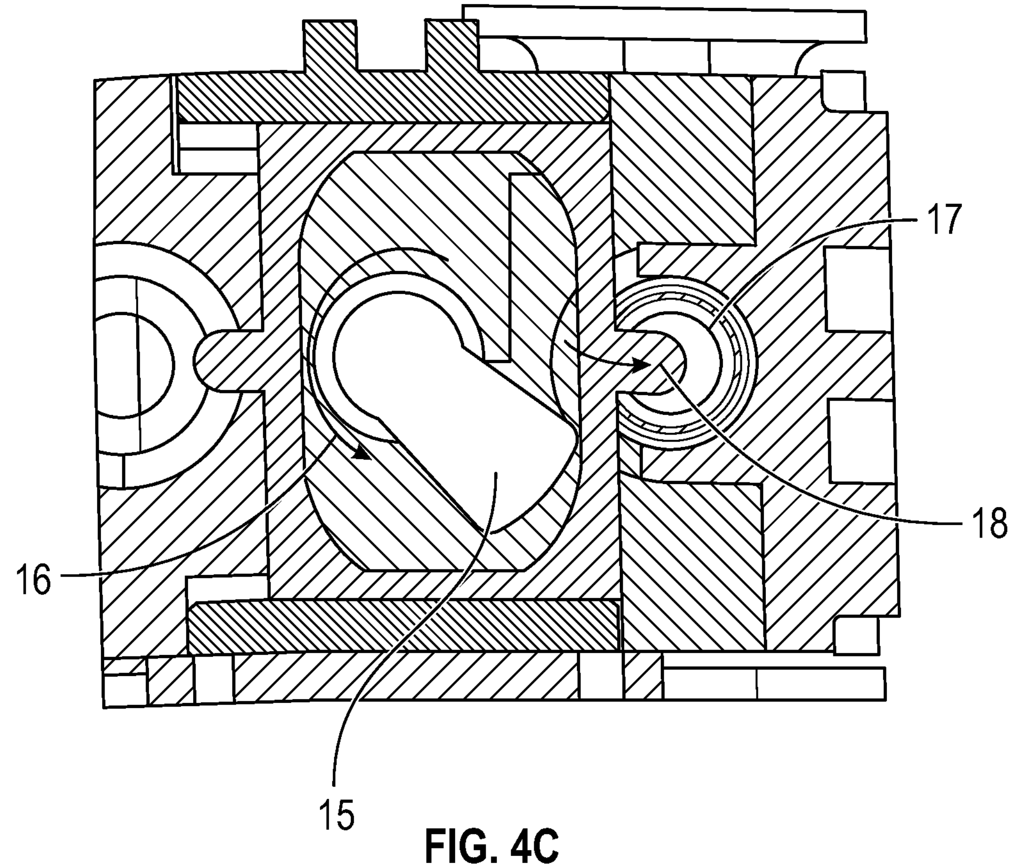

Operation of an illustrative peristaltic pump can be explained as follows with specific regard to FIGS. 4A, 4B and 4C. A cam shaft 13 in FIG. 4B and 15 in FIG. 4C driven by a gearmotor though the center of the housing rotates (direction shown by arrow 16 in FIG. 4C) to actuate moving elements (which for the purpose of this prototype are disks 12*a*, 12*b*, etc. in FIG. 4A) in a sequence that forces (see direction of force given by arrow 18) the sidewalls of the tube 17 together, the pinching action evacuating the tube and preventing flow in this section of the tube. The tube always has at least one section completely closed to prevent back-flow/leakage and generate the pressures required for self-priming and dispensing. In some embodiments, each cam lobe may be designed with a constant radius that keeps each disk fully depressed until the next is in position, and there is a small overlap whereby adjacent disks are both fully depressed to prevent loss of pressure/leak through the pipe.

The operation of the concept has been proven using individual disks, of which a minimum of 3 may be utilized for operation, but in embodiments about 10 may be utilized. A specific illustrative pump described later uses 11 disks. Alternatives that may be better for manufacturing could include flexible spring members, which could be made out of various materials, including for example flexible plastics, metals, etc., between the camshaft and the peristaltic tube. Or other moving elements with similar profiles. The camshaft design is shown from the end in FIG. 4A and from a perspective view in FIG. 4B. The 11 cams operate individual disks, with one revolution pressing all of the disks in turn. At the start/end of the revolution the disks transition and the one at the end is depressed. The camshaft and operation are demonstrated by examining FIGS. 4A, 4B and 4C.

A standard conventional peristaltic pump may have inherent disadvantages when compared to a linear peristaltic pump for this system. Principally they may include: the tube must bend around the casing which limits the ability to expand and pump high viscosity fluids (the tighter the radius—smaller pump—the worse the impact); the longer the pathway though the pump will lead to more adhesive in the system and potentially waste, also increased pressure requirements due to increased drop over the length of tube with high viscosity fluids; and the system would be larger as the fluid pathway cannot be arranged in line with the motor and container.

In some embodiments, especially those utilizing a linear peristaltic pump, the portion of the adhesive delivery channel that is acted upon by the pump may utilize standard silicone peristaltic tubing with a constant profile and wall thickness. The advantage of using constant circular profile tubes is the lower cost and ease of attachment to a manifold for inlet and outlet flows, and no alignment required in assembly. In some embodiments, the tube was compressed between a flat section of the moving element and housing cap, resulting in a flat profile when fully compressed. This is the conventional way a peristaltic pump operates. One disadvantage of this approach may become apparent when the inlet fluid is pressurized. Pressurizing the inlet fluid helps to feed a high viscosity fluid into the pump from a containment area, but in a peristaltic where the tube is flexible it tends to expand the tube and therefore increase the dispensed amount per rotation, leading to drift in accuracy.

Figure 5A:
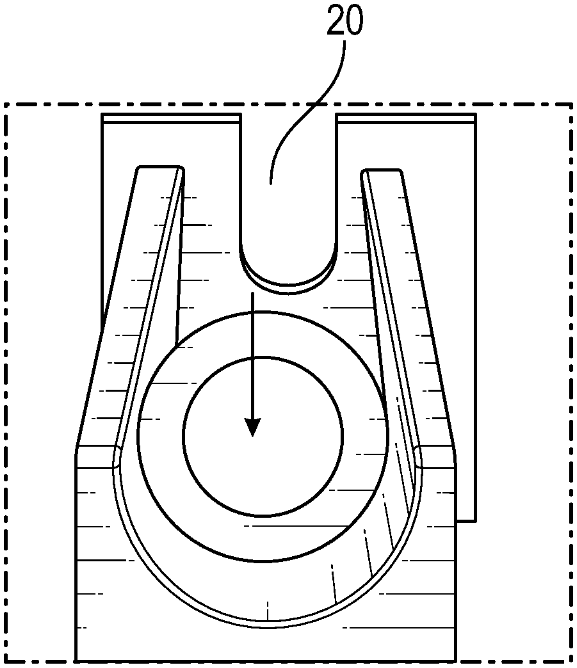
FIGS. 5A and 5B are perspective views of the tubing of a fluid delivery channel with a compressive element not applying pressure (FIG. 5A) and applying pressure (FIG. 5B) on the tubing.
Figure 5B:
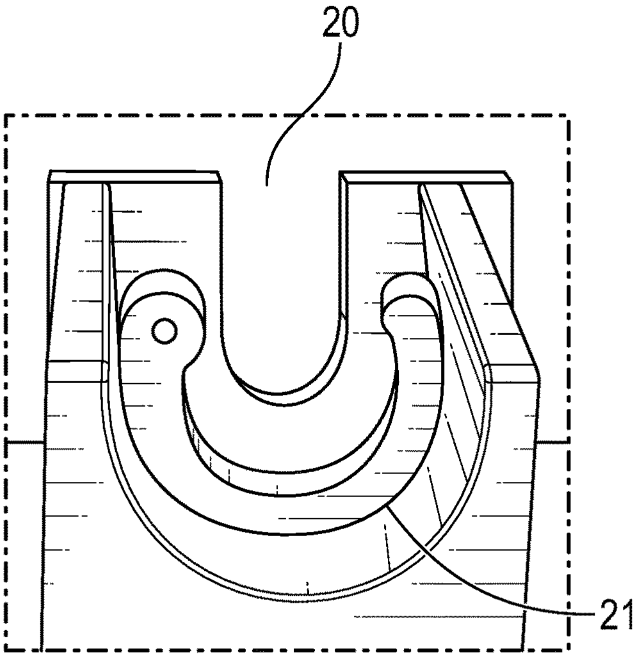

For this reason, a different compression profile may be advantageous to both increase the flow rate and also allow the tube to be constrained from expanding outwards when the fluid is under pressure. In FIGS. 5A and 5B a piece was manufactured to demonstrate the profile of the tube holder and compression applicator 20 which may be part of the disk. In the illustrated embodiment, the compression applicator and semi-circular form 21 (in FIG. 5B) are complementary to compress the tube uniformly (in some embodiments to 3.2 mm) at full extension. This form of compression into a profiled section may provide a higher flow rate and reduced speed dependence, both of which may be advantages for some of the intended use cases for this pump.

Linear peristaltic pumps, as well as any positive displacement pumps are able to be adapted to different mix ratios from the at least two flexible containment vessels. Specifically, there are a number of ways of adapting linear peristaltic pumps to dispense adhesives with mix ratios different than 1:1. One such method includes adjusting the relative flow between the material from the first flexible containment vessel and the second flexible containment vessel and hence the mix ratio, by choosing a set of tubes with internal volume ratios that match the desired mix ratio. The wall thickness must be kept constant as this determines how the pipe collapses and the compression is fixed by the pump disks/wall position (in some embodiments, these could be altered with inserts). Silicone extruded pipes which are commonly used in peristaltic tubing can be manufactured at relatively low cost using custom dies to achieve the control of the inner diameter. A specific illustrative example of how the two tubes for materials from the first flexible containment vessel and the second flexible containment vessel respectively, could be chosen to provide a desired mix ratio for a product is as follows. A 10:1 mix ratio could pair a 6 mm inside diameter (ID) tube for the material from the first flexible containment vessel and a 1.90 mm ID tube for the material from the second flexible containment vessel. This specific configuration could be used for the commercially available 3M™ Scotch-Weld™ Low Odor Acrylic Adhesive DP8810NS (3M Co., St. Paul MN) for example. Additional examples could utilize 6 mm ID and a 4.24 mm ID for an adhesive that had a 2:1 mix ratio, and a 3.46 mm ID and a 2 mm ID for an adhesive that had a mix ratio of 3:1.

In some embodiments, useful pumps, such as linear peristaltic pumps do not require the use of disks such as those depicted, in such embodiments, the cam shaft of the pump itself could press on the tubing going therethrough. In some embodiments that include disks in the pumps, there can be a small overlap in adjacent disks to prevent loss of pressure/leak through the first and second tubes. In some embodiments that include disks, there can be at least three disks, at least 5 disks, at least 8, or even at least 10 disks. In some embodiments, the noted disks can be flexible plastic spring members. In some embodiments, a single revolution of the shaft presses all of the disks against the tube. In some embodiments, a single revolution of the shaft presses less than all of the disks against the tube.

Disclosed systems can be utilized for mixing and dispensing materials (e.g., the components to be mixed from the first and second flexible containment vessels) that have relatively high viscosities as well. The range of viscosity and thixotropic behavior of components of adhesives make them difficult to pump accurately. Disclosed systems and devices can dispense both lower relative viscosity adhesives (e.g., 3M™ Scotch-Weld™ Urethane Adhesive DP620NS Black) and higher viscosity adhesives (e.g., 3M™ Structural Adhesive SA9820).

In some embodiments, a unique geometry of tubing (e.g., the portion of the fluid pathway that is acted upon by the pump) is employed to both control the compression and expansion of the tube to allow the pumping of higher viscosity fluids. In this embodiment, the tube has a mechanical (e.g., a lock and key type connection) connects to the moving elements in the pump which compress (as a conventional linear peristaltic) but uniquely also attach to pull the tubing open as the moving element translates away from the tubing, forcing it to open with greater force than the material properties of the tube alone. Therefore, the pump can handle fluids of a higher viscosity than conventional designs.

Figure 6A:
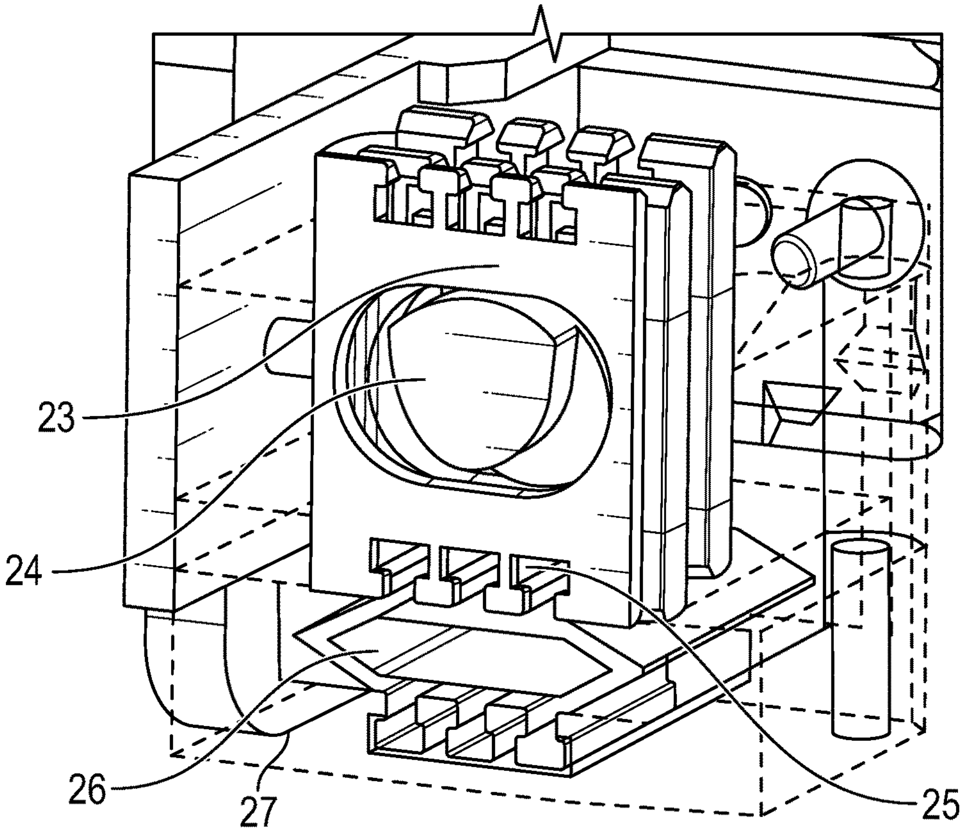
FIGS. 6A, 6B, and 6C are perspective and end on views (FIG. 6A) of a linear peristaltic pump housing and inner components that includes a tube having rigid members that interact with both the actuating element and the housing; the tube (FIG. 6B) having rigid members; and a cut out view of the linear peristaltic pump acting upon the tubing (FIG. 6C).

One specific embodiment of such a design can be seen in FIG. 6A. FIG. 6A depicts a single pump for pumping of the material from a first flexible containment vessel, for example. In FIG. 6A, 23 is an actuator element that is designed to engage with the tubing 26 and be acted upon by the pump itself through the rotating cam shaft 24 that translates to the actuator element (e.g., the disk in the linear peristaltic pump that moves) 23. The tubing 26 in this embodiment has interlocking features 25 between the actuator element 23 and the tubing 26. The actuator element 23 in this specific embodiment only undergoes movement in the vertical direction (normal to the base of the housing 27), but it should be noted that such movement is not the only direction in which various actuator elements can move.

Figure 6B:
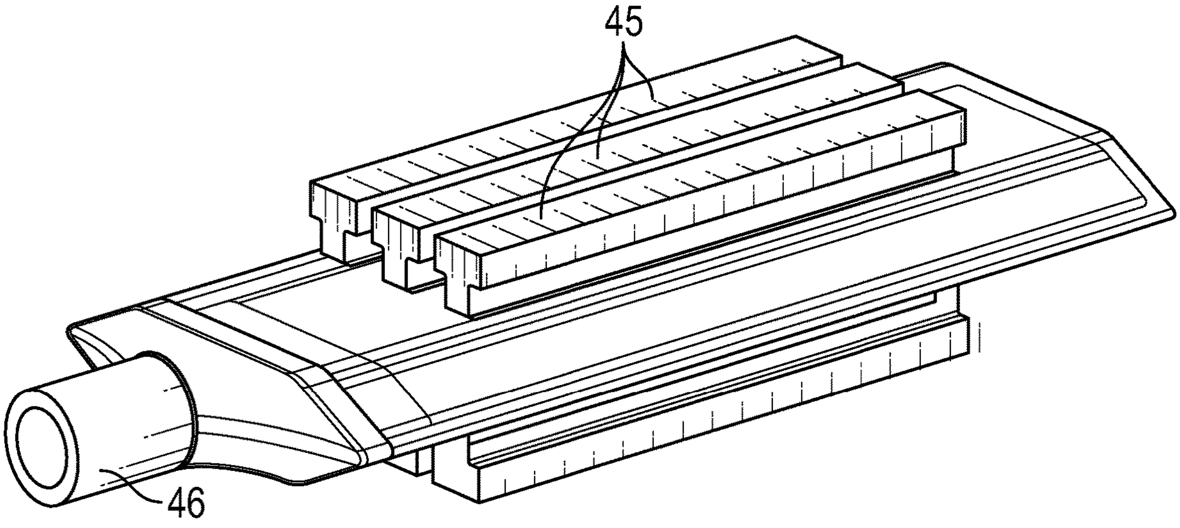

FIG. 6B shows an illustrative configuration of the tubing that traverses the pump region of the system. This specific embodiment includes three ribs 45 that are present on both the top and bottom surfaces of the tubing. The ribs 45 are configured to engage with specifically designed voids in the actuator elements. The tubing also includes a rigid inlet 46 and rigid outlet (not shown in FIG. 6B). The rigid inlet 46 is fluidly connected to the outlet manifold of the chamber and the rigid outlet is fluidly connected to a mixing nozzle. In this embodiment, the ribs are inserted into grooves in the actuator elements that will be above the tubing and the lower housing of the pump. It should be noted that the ribs in FIG. 6B are not uniform along the length but could certainly be uniform along the length of the tubing. At each end a rigid coupler to the inlet and outlet is inserted or joined to the tubing. Alternatively, the inlet and outlet could be welded on, push fit on, or some other method of attachment. As the tubing is inserted into the housing and the pump is run, the tubing is forced to either open or close to fluid flow. In some embodiments, the housing and actuator elements could open to allow the tubing to be dropped in.

Figure 7A:
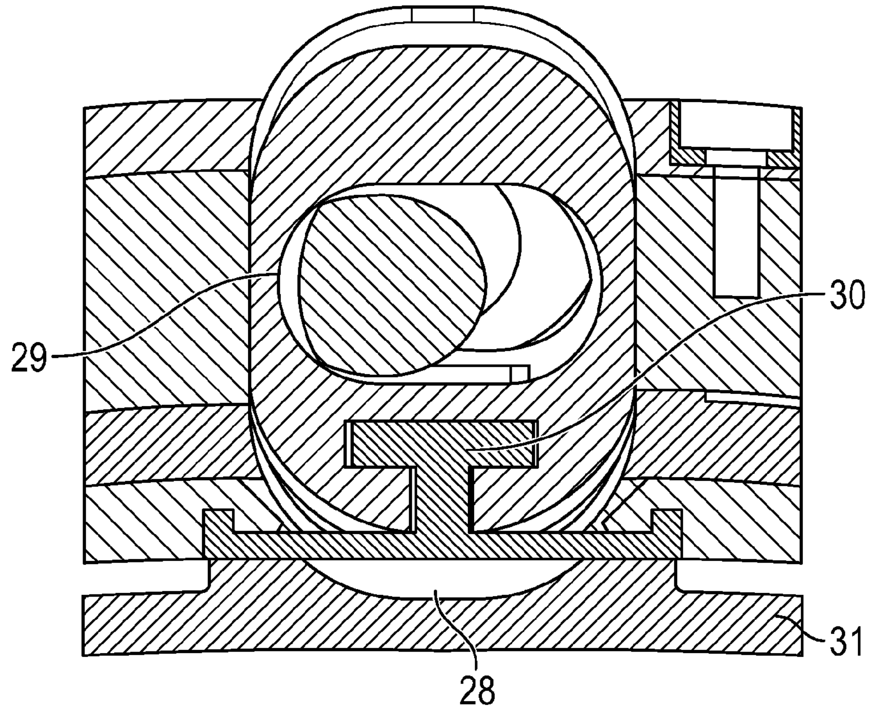
FIGS. 7A, 7B and 7C are a cut out view (FIG. 7A) of a linear peristaltic pump housing and inner components that includes a tube including a flexible membrane and a rigid plate that interact with both the actuating element and the housing; a perspective view (FIG. 7B) of the linear peristaltic pump in its housing; and a cut out view of the linear peristaltic pump acting upon the tubing (FIG. 7C).

Another specific embodiment that may be useful for high viscosity components can be seen in FIG. 7A. The components of the system shown in FIG. 7A include the actuator elements 29 (e.g., the disk in the linear peristaltic pump that moves) that acts on the inner volume 28 of the tubing, a flexible membrane 30 that is both sealed on the tubing that runs through the pump and is attached to the bottom of the actuator elements 29 and the rigid housing 31 that is sealed to the membrane 30.

Figure 6C:
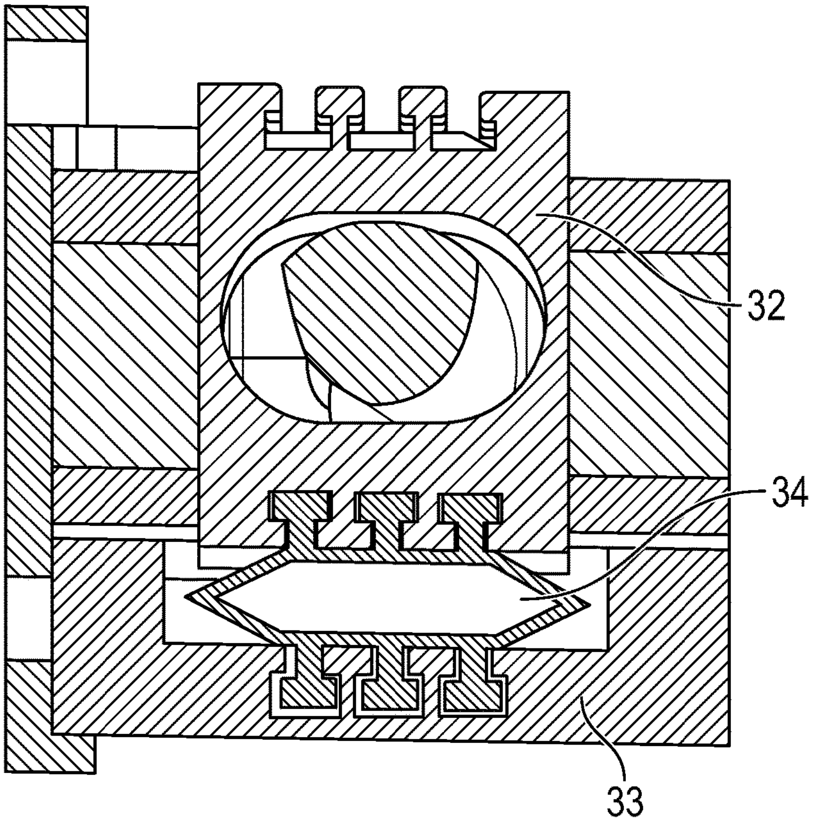
Figure 7B:
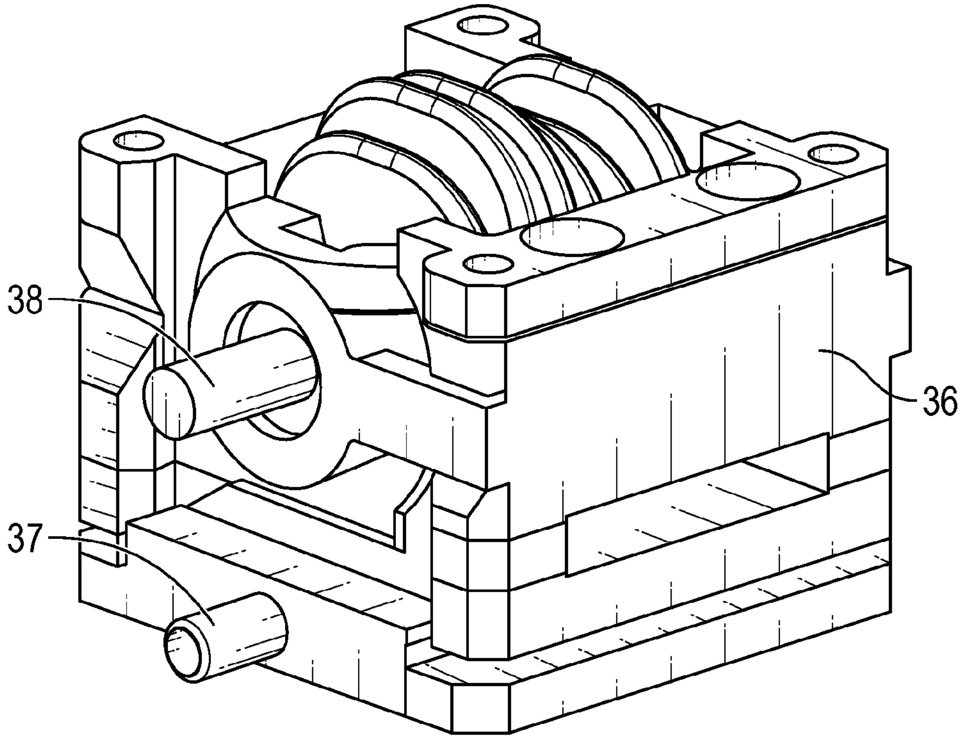
Figure 7C:
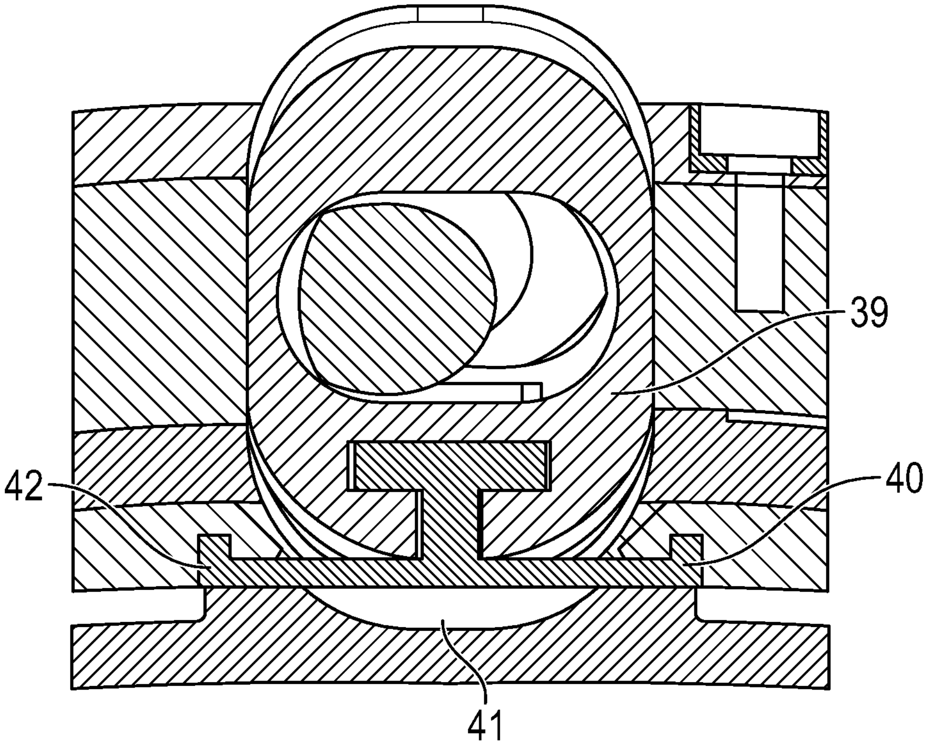

The mode of operation of the embodiments in FIGS. 6 and 7A are similar and are illustrated by FIGS. 7B and 7C showing a single actuator element. As the moving disk is translating upwards (relative to FIG. 7A) the membrane or extrusion is connected in such a way that the top surfaces are pulled away from the lower surfaces causing an increase in the inner volume of the tubing. This expansion will create a negative pressure pulling in the next section of fluid from the inlet. Normally this expansion is limited by the properties of the tube but in disclosed embodiments is greatly enhanced by the cam driven moving disk. FIG. 7B shows the inlet 37 into the pump, the camshaft 38 and the housing or main body 36. FIG. 7C shows the membrane 42 clamped into the housing, the actuator element 39 and the silicone extrusion 40 that ultimately forms the inner volume 41. The membrane is sealed to the rigid housing which forms the lower fluid pathway and inlet and outlet ports. The rigid housing would therefore contact the fluid and become a disposable component. In the prototype the housing was sealed to a 3D printed flexible membrane using adhesive. A commercial solution could weld the components together or seal them by clipping together. When inserted into the housing and slid into the disks the membrane is fully compressed (occluded) at some point. The disk, membrane geometry and rigid housing are designed together to ensure the fluid pathway is fully closed when the disk is in full depression state.

Disclosed devices or systems also include a mixing tip. As the materials from the first and second flexible containment vessels are drawn out of the first and second flexible containment vessels via the negative pressure applied by the pump(s), they come out of the chamber via the outlet manifold and then enter the pump (e.g., through some fitting that connects the outlet manifold to an inlet or inlets into the pump or pumps. After the pump has acted on the material, it is forced through the pump and eventually both materials reach the outlet of the pump(s). The mixing tip is then fluidly connected to the outlet of the pump(s) (e.g., through some fitting(s) that connects the outlet of the pump(s) to the mixing tip). It is at the mixing tip that the at least two materials are mixed to form the adhesive to be applied by the device or system.

Whether the amounts of Part 1 and Part 2 (as well as any additional parts) are provided via an electronically controlled or handheld type dispenser, the two parts still must be mixed before being utilized. Alternatively, or additionally, two or more sub-Parts may have to be combined and mixed thoroughly. Often two component epoxy adhesives have one color for the resin and another color for the hardener—in these cases it is fairly easy to visualize when you've mixed the adhesive thoroughly. When both the resin and hardener are the same color, it may be more difficult.

Mixing nozzles or mixing tips may be useful to provide mixing of the at least two Parts (as well as any sub-Parts that need to be mixed to form the Parts or additional Parts). The mixing tip is designed and/or configured to receive the two parts from the at least two adhesive delivery channels and mix the two parts together to form the adhesive. The mixing tip also functions to deliver, dispense, or both the adhesive through a dispensing end.

In general, any type of mixing nozzle can be utilized. For example, static mixers, dynamic mixers, turbo mixers (also known as Quadro mixers) can all be utilized herein. In the case of using dynamic mixers, the motor that is already built into the device can drive the dynamic mixer. Static mixers are the oldest technology in two-part adhesive dispensing. These nozzles are round and come in a wide range of connection types. Standard mixers typically require longer nozzles and more mixing elements to create the same mixing quality as Quadro mixers.

Quadro mixers are generally square in shape. Quadro mixers allow for more complete mixing in a shorter nozzle. The advantage of Quadro style nozzles is that there is less wasted adhesive left over in the nozzle and users can get closer to their substrates when dispensing.

Dynamic mixers are generally motor driven. Devices disclosed herein can utilize the motor previously discussed (that runs the at least one pump) to run the dynamic mixing nozzle or can utilize a separate motor.

Static mixers can take any number of forms, each suited to particular applications and with unique advantages and disadvantages. These include in-line mixers, where components are placed as a permanent part of the dispensing line, and static dynamic mixers, which have moving parts but are not powered. Disposable bayonet mixers, however, are by far the most common and widely applicable. Disposable static mixers take the form of a nozzle that attaches to either meter mix and dispense (MMD) or handheld dispensing equipment. Their internal components can vary greatly depending on the needs of the application. The most common are the helical type and the box chamber type. Disposable static mixers are designed to be thrown away after use which can be cost effective compared to the flushing and cleaning necessary in non-disposable mixers. They also make sense for equipment which will handle multiple adhesive types.

There are many different varieties of static mix nozzles. It is important to use the one specified by the manufacturer to ensure proper mixing occurs. The number of elements in the nozzle dictate the number of stirs the adhesive gets while passing. Nozzles can range from 24 to 56 elements so the nozzle with 24 elements only stirs the adhesive 24 times—the one with 56 has more than double the number of stirs, for example.

Handheld Device

Figure 8:
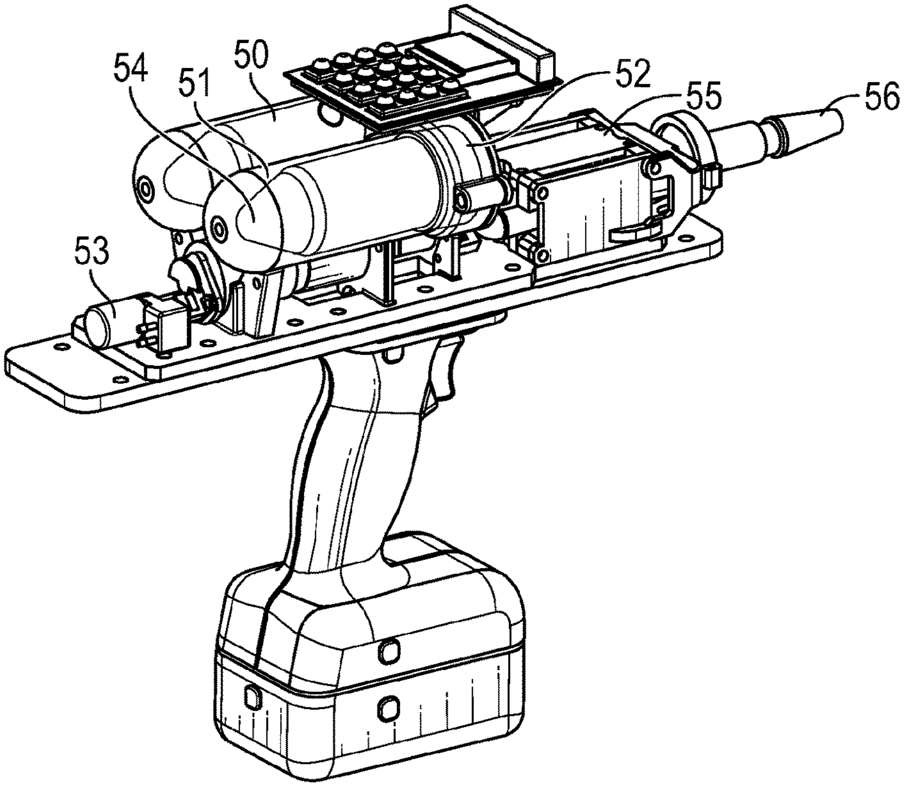
FIG. 8 is a perspective partial exposed view of an illustrative handheld device disclosed herein.

FIG. 8 depicts a possible embodiment of a handheld device or system for mixing of two components to form an adhesive and deliver the same to a substrate. The applicator in FIG. 8 includes a chamber 54 that holds a first flexible containment vessel 50 and a second flexible containment vessel 51 and has an outlet manifold 52. Compressing element 53 provides compression for the flexible containment vessels. The motor driving pump 55 is located beneath first flexible containment vessel 50 and a second flexible containment vessel 51. In this embodiment, a single pump is utilized to pump material from both the first flexible containment vessel 50 and the second flexible containment vessel 52. The device also includes a mixing tip 56. This device could also include a processor (not called out in figure) to which input can be provided by the user through the keyboard 57. Such a processor can also be utilized to control a metering element that controls the pump(s). Integration and configuration of the noted components as well as power, etc. to enable the device would be known to those of skill in the art having read this specification.

Figure 9A:
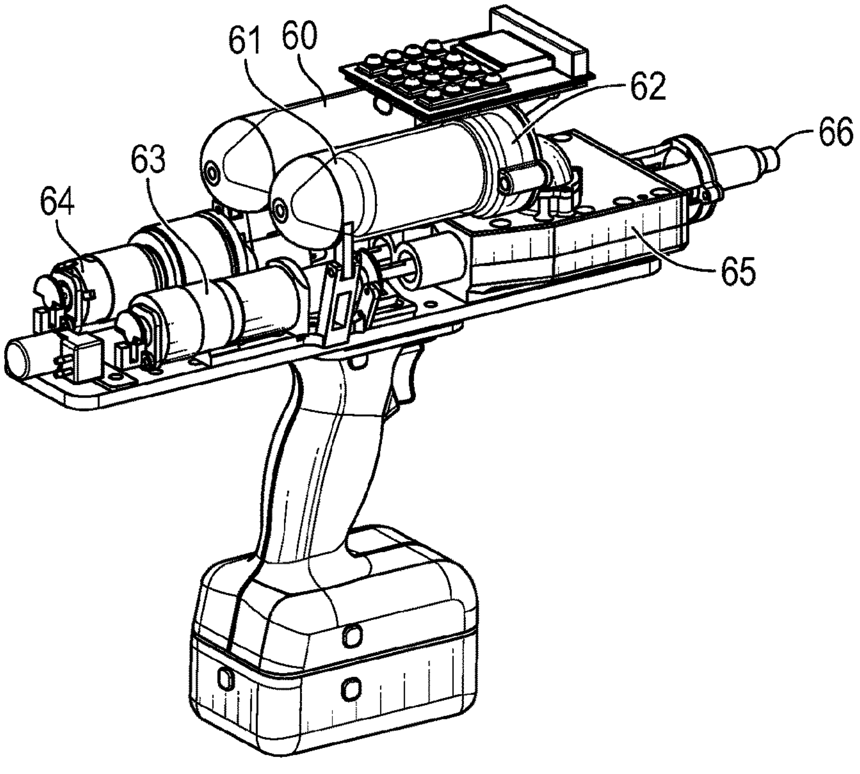
FIGS. 9A, 9B and 9C are a perspective partial exposed view (FIG. 9A) of an illustrative handheld device disclosed herein; a partial cut out view of the same (FIG. 9B); and a partial cut out of the grip of the same (FIG. 9C).
Figure 9B:
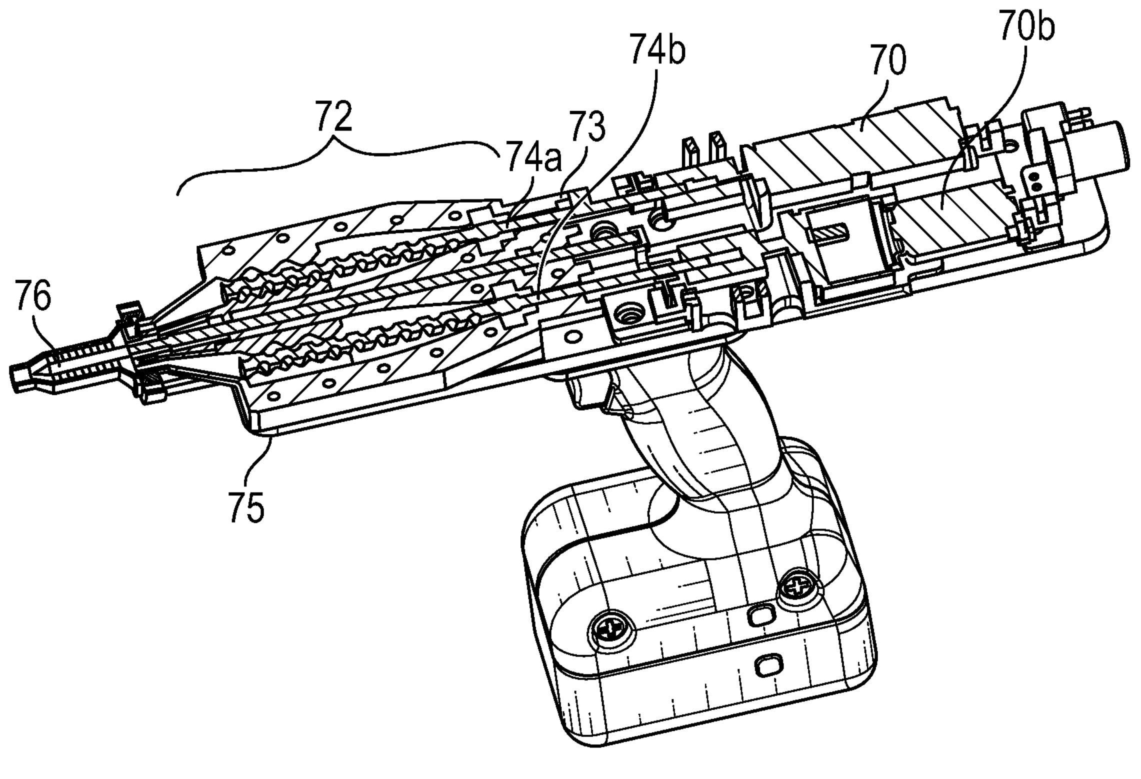
Figure 9C:
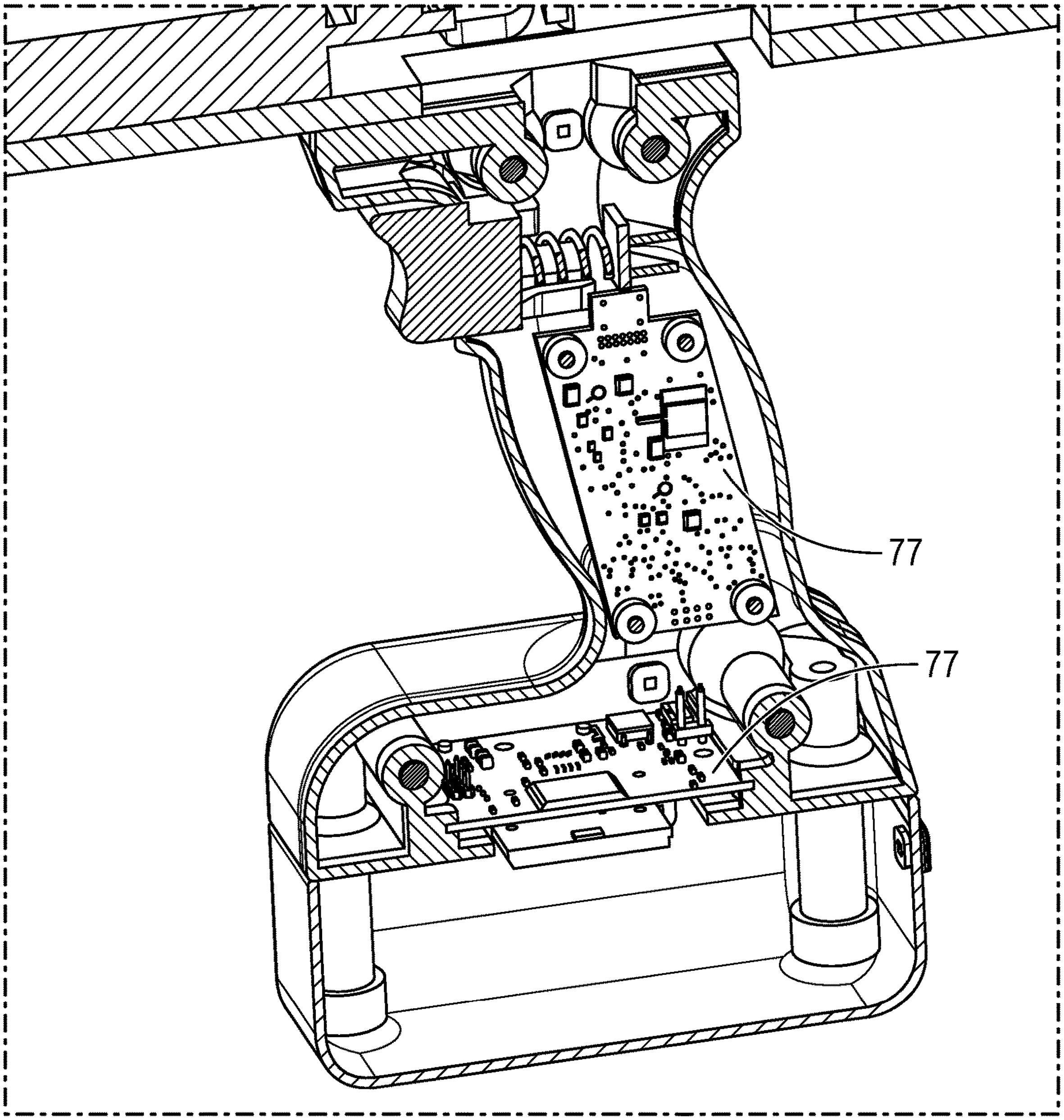

FIG. 9A shows another possible embodiment of a handheld device or system for mixing of two components to form an adhesive and deliver the same to a substrate. The applicator in FIG. 9A includes a first flexible containment vessel 60 and a second flexible containment vessel 61 housed within a chamber having an outlet manifold 62. The device also includes two side by side pumps of which one is specifically noted as pump 65. In this embodiments, these are progressive cavity pumps. This device includes two motors 63 and 64 that run the first pump 65 and the other pump. The device also includes a mixing tip 66. FIGS. 9B and 9C show cutout portions of the device in FIG. 9A. In FIG. 9B, the first and second motors are shown by 70 and 71. The first 70 and second 71 motors act on the first and second shafts 74*a* and 74*b*. The region 72 indicates where a disposable or cleanable element would exist in order to enable reuse of the entire system. The pumps are enclosed with a pump casing 73 and the entire device is disposed within an outer housing 75. The device also includes the mixing tip 76. FIG. 9C shows electronics 77 within the grip area of the devices outer housing.

Multipart Structural Adhesives

Disclosed herein are methods, systems, devices and structural adhesives that can include what are referred to herein as multipart adhesives or multipart structural adhesives. Multipart, as used herein can refer to any final adhesive that is formed by a user or applicator (e.g., anyone that is going to be using the adhesive) by combining two or more parts, e.g., two parts, three parts, four parts, five parts, etc., As such, multipart adhesives can include two-part adhesives, three-part adhesives, four-part adhesives, etc. It is noted that two-part adhesives can also be referred to in the industry as 2K adhesives.

In order to more conveniently and clearly refer to components making up a multipart adhesive, the phrases "Part 1", "Part 2", "Part 3", etc. will be used herein. It is noted that nothing is meant or to be implied by referring to a component as Part 1 versus Part 2—for example, order of mixing is not meant and/or not meant to be implied by referring to a component as Part 1 versus Part 2.

Any "Part" may be composed of or formed by combining portions of that part. In order to more conveniently and clearly refer to such portions of parts, the phrase sub-Part will be used herein. Additionally, because more than one component can be composed of or formed by combining more than one portion of that part, in order to more conveniently and clearly refer to such portions, the phrases "first sub-Part 1", "second sub-part 1", "third sub-Part 1", and etc. will be used herein. In instances where two (or more) components can both (or all) be composed of or formed by combining more than one portion of that component, the phrases "first sub-Part 1", "second sub-part 1", "third sub-Part 1", and etc.; and "first sub-Part 2", "second sub-Part 2", "third sub-Part 2", and etc. can be utilized at the same time. It is noted that nothing is meant or to be implied by referring to a component as first sub-Part 1 versus second sub-Part 1—for example, order of mixing is not meant and/or not meant to be implied by referring to a sub-Part of a component as first versus second.

In some embodiments, the amounts of the two (or more) Parts, the ratio of the two (or more) Parts, or both can be utilized to impact one or more specifically noted properties of the multipart adhesive being formed. The ratio of the two Parts can also be referred to as the mix ratio. It is to be noted that the two Parts may both be made of sub parts as well.

In some embodiments, at least one of Part 1, Part 2, or etc. is composed of or formed by combining more than one portion of that part. The amounts of the at least two sub-Parts, the ratios of the at least two sub-Parts, or both can be utilized to impact the one or more specifically noted property of the multipart adhesive being formulated.

Generally, the amounts of any of the components described herein (e.g., Parts or sub-Parts) are utilized in stoichiometric ratios based on the adhesive chemistry, the desired properties, other factors, or combinations thereof.

Structural adhesives or structural adhesive compositions as disclosed herein can include adhesive compositions that can be categorized as structural adhesives, semi-structural adhesives, or both.

"Structural adhesive" as used herein means an adhesive that binds by irreversible cure, typically with a strength when bound to its intended substrates, measured as stress at break (peak stress) using the overlap shear test described in the Examples herein, of at least 4.14 MPa (600 psi), more typically at least 5.52 MPa (800 psi), in some embodiments at least 6.89 MPa (1000 psi), and in some embodiments at least 8.27 MPa (1200 psi). Additionally, in some embodiments, these adhesives may provide at least one of 1) an overlap shear value of >5 MPa (>725 psi), 2) a cleavage value (plastic to glass of >40 N (>9.0 lbf), and 3) a creep of <500% strain, using the test methods described herein.

"Semi-structural Adhesive" refers to a cured adhesive having an overlap shear strength of at least about 0.75 MPa (109 psi), more preferably at least about 1.0 MPa (145 psi), and most preferably at least about 1.5 MPa (218 psi). However, these cured adhesives with particularly high overlap shear strength are called structural adhesives. Additionally, in some embodiments, these adhesives may provide at least one of 1) an overlap shear value of >5 MPa (>725 psi), 2) a cleavage value (plastic to glass of >40 N (>9.0 lbf), and 3) a creep of <500% strain, using the test methods described herein.

Structural adhesive compositions may be useful in many bonding applications. For example, structural adhesive compositions may be used to replace or augment conventional joining techniques such as welding or the use of mechanical fasteners such as nuts and bolts, screws, rivets, and the like.

One or More Properties

Structural adhesive compositions can be characterized by any of a number of properties. In some embodiments, one or more than one property can be modified or tuned using disclosed methods, systems and devices. Illustrative properties that can be modified or tuned using disclosed methods, systems and devices can include for example work life, shelf life, pot life, gel time, rate of strength build up, elastic modulus (i.e., modulus of elasticity), elongation, bond strength (e.g., adhesion, peel strength, overlap shear strength, or impact strength), handling strength, structural strength, creep resistance, impact resistance, temperature performance, moisture resistance, color, and other physical properties.

As used herein, "gel time" refers to the time required for the mixed components to reach the gel point. As used herein, the "gel point" is the point where the mixtures storage just exceeds its loss modulus.

Generally, the bond strength (e.g., peel strength, overlap shear strength, or impact strength) of a structural adhesive continues to build well after the initial cure time. For example, it may take hours or even days for the adhesive to reach its ultimate strength.

"Handling strength" refers to the ability of the adhesive to cure to the point where the bonded parts can be handled in subsequent operations without destroying the bond. The required handling strength varies by application. As used herein, "initial cure time" refers to the time required for the mixed components to reach an overlap shear adhesion of 0.34 MPa (50 psi); which is a typical handling strength target. Generally, the initial cure time correlates with the gel time; i.e., shorter gel times typically indicate adhesives with shorter initial cure times.

The "pot life" refers to the amount of time it takes for the product's initial mixed viscosity to double. A product's pot life is dramatically different than its shelf life. Of course, this test has several variations that can occur, including the mass of the product and the temperature at which the test is conducted. Simply put, this is the length of time in which adhesives or coatings can be applied on a surface. Pot life begins when the mixing is complete and ends when the mix is unsuitable for application. Failure in pot life is due to inadequate mixing of the product or if the material sits for too long after mixing. Pot life also depends on different materials being bonded. Knowing the pot life of a product is useful for scenarios in which an adhesive must be mixed and let sit for a certain amount of time before application. This will impact the speed at which a project can be completed. The pot life is the amount of time you have after mixing to use the adhesive before it has doubled in viscosity—or simply how long you can leave it in the pot before use.

The "working life" or "work life" (which is also referred to as WL) of a product is the amount of time the viscosity stays low enough to be applied to a surface with accuracy before it begins to cure. Again, this depends on a multitude of factors, such as temperature, sun exposure, humidity levels, and more. The WL of a mixed Epoxy Adhesive can be increased or decreased with Temperature. Higher temperatures accelerate the cure and colder temperatures will slow the cure. In many applications, this isn't a practical way to control WL.

The "Shelf life" of a product is the period of time before the performance of the product falls under the values provided in the technical data sheet (TDS) for at least one of the critical values.

The modulus of elasticity of the cured adhesive is typically at least 100 MPa (14,500 psi). In some embodiments, the elastic modulus is 200 MPa (29,010 psi), or 300 MPa (43,510 psi), or 400 MPa (58,020 psi), or 500 MPa (72,520 psi) or greater. The elastic modulus is typically below 2000 MPa (290,080 psi). It is speculated that the elastic modulus (E') at 25° C. (77° F.) is at least in part related to the maintenance and/or penetration of the luminance by aging.

In some embodiments, the average toughness at 25° C. (77° F.) and a strain rate of 3%/min is typically greater than 1 MJ/$m^3$. In some embodiments, the average toughness is 2, or 3, or 4, or 5 MJ/$m^3$. The average toughness is typically less than 15 MJ/$m^3$.

In some embodiments, the elongation of the cured adhesive composition is assumed to be at least in part related to the peel strength. In some embodiments, the average elongation at break at a strain rate of 25 and 3%/min is 15% or 20% or more, and in some embodiments, 25% or more, 50% or more, or about 100% or more. The average elongation at break is typically less than 300%.

The Shear Strength of a cured adhesive can be measured using the test method described in ASTM D 1002. Testing can be carried out by pulling the two ends of the overlap in tension causing the adhesive to be stressed in shear. Two variations can also be used: ASTM D 3165 and ASTM D 3528. Compression shear tests can also be utilized. ASTM D 2182 describes a compression specimen geometry and the compression shear test apparatus.

The creep resistance refers to the resistance to dimensional change occurring in a stressed adhesive over a long time period. With weak adhesives, creep may be so extensive that bond failure occurs prematurely. Creep testing can be done by loading a specimen with a pre-determined stress and measuring the total deformation as a function of time or measuring the time necessary for complete failure of the specimen. In some instances, the creep resistance of a cured adhesive can be measured using ASTM D 2294.

In some embodiments, the impact resistance of the cured adhesive can be determined. In some instances, the impact resistance can be determined by using ASTM D 950.

The temperature performance of a cured adhesive can be measured using ASTM C 920, which requires a maximum percentage of weight loss of 10-12% after heat aging for two weeks at 158° F. (70° C.). The conditioning generally specified is the application of accumulated time at temperature expected in service.

The moisture resistance of a cured adhesive can be measured using water immersion of the specimens. Generally, three weeks is the time period recommended for most immersion testing. ASTM D 1151 can be utilized to measure moisture resistance.

Useful Multipart Structural Adhesives

Generally, structural adhesives may be divided into two broad categories: one-part adhesives and two-part adhesives. With a one-part adhesive, a single composition comprises all the materials necessary to obtain a final cured adhesive. Such adhesives are typically applied to the substrates to be bonded and exposed to elevated temperatures (e.g., temperatures greater than 50° C. (122° F.) to cure the adhesive. In contrast, two-part adhesives comprise two components. The first component, typically referred to as the "base resin component," comprises the curable resin. The second component, typically referred to as the "accelerator component," comprises the curing agent(s) and catalysts. Various other additives may be included in one or both components. In some embodiments, one-part adhesives are not included in the methods, systems and devices disclosed herein.

Two component adhesives are 100% solids systems that obtain their storage stability by separating the reactive components. They are supplied as "resin" and "hardener" in separate containers. It is important to maintain the prescribed ratio of the resin and hardener in order to obtain the desired cure and physical properties of the adhesive. The two components are only mixed together to form the adhesive a short time before application with cure occurring at room temperature. Since the reaction typically begins immediately upon mixing the two components, the viscosity of the mixed adhesive increases with time until the adhesive can no longer be applied to the substrate or bond strength is decreased due to diminished wetting of the substrate. Formulations are available with a variety of cure speeds providing various working times (work life) after mixing and rates of strength build-up after bonding. Final strength is reached in minutes to weeks after bonding depending on the formulation. Adhesive must be cleaned from mixing and application equipment before cure has progressed to the point where the adhesive is no longer soluble. Depending on work life, two component adhesives can be applied by trowel, bead or ribbon, spray, or roller. Assemblies are usually fixtured until sufficient strength is obtained to allow further processing. If faster rate of cure (strength build-up) is desired, heat can be used to accelerate the cure. This is particularly useful when parts need to be processed more quickly after bonding or additional work life is needed but a slower rate of strength build-up cannot be accommodated. When cured, two component adhesives are typically tough and rigid with good temperature and chemical resistance.

Two component adhesives can be mixed and applied by hand for small applications. However, this requires considerable care to ensure proper ratio of the components and sufficient mixing to insure proper cure and performance. There is usually considerable waste involved in hand mixing as well. As a result, adhesive suppliers have developed packaging that allows the components to remain separate for storage and also provides a means for dispensing mixed adhesive, e.g. side-by-side syringes, concentric cartridges. The package is typically inserted into an applicator handle and the adhesive is dispensed through a disposable mixing nozzle. The proper ratio of components is maintained by virtue of the design of the package and proper mixing is insured by use of the mixing nozzle. Adhesive can be dispensed from these packages multiple times provided the time between uses does not exceed the work life of the adhesive. If the work life is exceeded, a new mixing nozzle must be used. For larger applications, meter-mix equipment is available to meter, mix, and dispense adhesive packaged in containers ranging from quarts to drums.

Two-part adhesives consist of a resin and a hardener component which cure once the two components are mixed together. They remain stable in storage as long as the two components are separate from each other. Two-part adhesives are typically designed to be dispensed in a set ratio to gain the desired properties from the specifically formulated adhesive; common ratios include, 10:1, 2:1, 1:1 and so on. The reaction between the two components normally begins immediately once they are mixed and the viscosity increases until they are no longer usable. This can be described as work life, open time and pot life, as discussed above. Once cured, two component adhesives are tough and rigid with good temperature and chemical resistance.

Two Part Epoxy Adhesives

Like their one-part cousins, two-part epoxies are formulated from epoxy resins. Two-part epoxies are widely used in structural applications and are used to bond many materials including, for example: metal, plastic, fiber reinforced plastics (FRP), glass and some rubbers. They are generally fast to cure and provide a relatively rigid bond. Some compositions can often be brittle although toughening agents and elastomers can be utilized to reduce this tendency.

Two-part structural epoxy adhesives are made up of a Resin (Part A or Part 1) and Hardener (Part B or Part 2). An accelerator or chemical catalyst can speed up the reaction between the resin and hardener.

A two-part epoxy can cure at room temperature, so heat is not necessarily required when using one. Two-part epoxies generally achieve handling strength anywhere between five minutes and eight hours after mixing, depending on the curing agents. A chemical catalyst or heat can be applied to speed the reaction between the resin and hardener.

The resin that is the basis for all epoxy is the diglycidyl ether of bisphenol A (DGEBA). Bisphenol A is produced by reacting phenol with acetone under suitable conditions. The "A" stands for acetone, "phenyl" means phenol groups and "bis" means two. Thus, bisphenol A is the product made from chemically combining two phenols with one acetone. Unreacted acetone and phenol are stripped from the bisphenol A, which is then reacted with a material called epichlorohydrin. This reaction sticks the two ("di") glycidyl groups on ends of the bisphenol A molecule. The resultant product is the diglycidyl ether of bisphenol A, or the basic epoxy resin. It is these glycidyl groups that react with the amine hydrogen atoms on hardeners to produce the cured epoxy resin. Unmodified liquid epoxy resin is very viscous and unsuitable for most uses except as a very thick glue.

Chemical raw materials used to manufacture curing agents, or hardeners, for room-temperature cured epoxy resins are most commonly polyamines. They are organic molecules containing two or more amine groups. Amine groups are not unlike ammonia in structure except that they are attached to organic molecules. Like ammonia, amines are strongly alkaline. Because of this similarity, epoxy resin hardeners often have an ammonia-like odor, most notable in the air space in containers right after they are opened.

Reactive amine groups are nitrogen atoms with one or two hydrogen atoms attached to the nitrogen. These hydrogen atoms react with oxygen atoms from glycidyl groups on the epoxy to form the cured resin—a highly crosslinked thermoset plastic. Heat will soften, but not melt, a cured epoxy. The three-dimensional structure gives the cured resin excellent physical properties.

The ratio of the glycidyl oxygens to the amine hydrogens, taking into account the various molecular weights and densities involved, determines the final resin to hardener ratio. The proper ratio produces a "fully-crosslinked" thermoset plastic. Varying the recommended ratio will leave either unreacted oxygen or hydrogen atoms depending upon which is in excess. The resultant cured resin will have lower strength, as it is not as completely crosslinked. Excess Part B results in an increase in moisture sensitivity in the cured epoxy and generally should be avoided.

Amine hardeners are not "catalysts". Catalysts promote reactions but do not chemically become a part of the finished product. Amine hardeners mate with the epoxy resin, greatly contributing to the ultimate properties of the cured system. Cure time of an epoxy system is dependent upon the reactivity of the amine hydrogen atoms. While the attached organic molecule takes no direct part in the chemical reaction, it does influence how readily the amine hydrogen atoms leave the nitrogen and react with the glycidyl oxygen atom. Thus, cure time is set by the kinetics of the particular amine used in the hardener. Cure time for any given epoxy system can only be altered by adding an accelerator in systems that can accommodate one, or by changing the temperature and mass of the resin/hardener mix. Adding more hardener will not "speed things up" and adding less will not "slow things down".

The epoxy curing reaction is exothermic. The rate at which an epoxy resin cures is dependent upon the curing temperature. The warmer it is the faster it goes. The cure rate will vary by about half or double with each 18° F. (10° C.) change in temperature. For example, if an epoxy system takes 3 hours to become tack free at 21° C. (70° F.), it will be tack free in 1.5 hours at 31° C. (88° F.) or tack free in 6 hours at 11° C. (52° F.). Everything to do with the speed of the reaction follows this general rule. Pot life and working time are greatly influenced by the initial temperature of the mixed resin and hardener. On a hot day for example, the two materials can be cooled before mixing in order to increase the working time.

The gel time of the resin is the time it takes for a given mass held in a compact volume to solidify. Gel time depends on the initial temperature of the mass and follows the above rule. One hundred grams (about three fluid ounces) of Silver Tip Laminating Epoxy with Fast Hardener (as an illustrative example) will solidify in 25 minutes starting at 25° C. (77° F.); at 15.6° C. (60° F.) the gel time is about 50 minutes. If the same mass were spread over 4 square feet at 25° C. (77° F.) the gel time would be a little over three hours. Cure time is surface area/mass sensitive in addition to being temperature sensitive.

As the reaction proceeds it gives off heat. If the heat generated is immediately dissipated to the environment (as occurs in thin films) the temperature of the curing resin does not rise and the reaction speed proceeds at a uniform pace. If the resin is confined (as in a mixing pot) the exothermic reaction raises the temperature of the mixture, accelerating the reaction.

Working time or Work Life (WL) of an epoxy formulation is about 75% of the gel time for the geometry of the pot. It can be lengthened by increasing the surface area, working with a smaller mass, or cooling the resin and hardener prior to mixing. Material left in the pot will increase in absolute viscosity (measured at 24° C. (75° F.), for example) due to polymerization but initially decrease in apparent viscosity due to heating. Material left in the pot to 75% of gel time may appear quite thin (due to heating) but will actually be quite thick when cooled to room temperature. Experienced users either mix batches that will be applied almost immediately or increase the surface area to slow the reaction.

Although the cure rate of an epoxy is dependent upon temperature, the curing mechanism is independent of temperature. The reaction proceeds most quickly in the liquid state. As the cure proceeds, the system changes from a liquid to a sticky, viscous, soft gel. After gelation the reaction speed slows down as hardness increases. Chemical reactions proceed more slowly in the solid state. From the soft sticky gel the system gets harder, slowly losing its stickiness. It becomes tack free and continues to become harder and stronger as time passes.

At normal temperatures the system will reach about 60 to 80% of ultimate strength after 24 hours. Curing then proceeds slowly over the next several weeks, finally reaching a point where no further curing will occur without a significant increase in temperature. However, for most purposes room temperature cured systems can be considered fully cured after 72 hours at 25° C. (77° F.). High modulus systems like Phase Two epoxy, for example, must be post-cured at elevated temperatures to reach full cure.

It is usually more efficient to work with as fast a cure time as practical for the application at hand if the particular system being used offers this choice. This allows the user to move along to the next phase without wasting time waiting for the epoxy to cure. Faster curing films with shorter tack times will have less chance to pick up fly tracks, bugs, and other airborne contaminants.

Epoxy resin compositions generally comprise a first liquid part comprising an epoxy resin and a second liquid part comprising a curing agent. Although the first and second part are liquids at ambient temperature, the liquid parts can comprise solid components dissolved or dispersed within the liquid.

The first part of the two-part composition comprises at least one epoxy resin. Epoxy resins are low molecular weight monomers or higher molecular weight polymers which typically contain at least two epoxide groups. An epoxide group is a cyclic ether with three ring atoms, also sometimes referred to as a glycidyl or oxirane group. Epoxy resins are typically liquids at ambient temperature.

Various epoxy resins are known including for example a bisphenol A type epoxy resin, a bisphenol F type epoxy resin, a bisphenol S type epoxy resin, a phenol novolac type epoxy resin, an alkyl phenol novolac type epoxy resin, a cresol novolac type epoxy resin, a biphenyl type epoxy resin, an aralkyl type epoxy resin, a cyclopentadiene type epoxy resin, a naphthalene type epoxy resin, a naphthol type epoxy resin, an epoxy resin of condensate of phenol and aromatic aldehyde having a phenolic hydroxy group, a biphenyl aralkyl type epoxy resin, a fluorene type epoxy resin, a Xanthene type epoxy resin, a triglycidyl isocianurate, a rubber modified epoxy resin, a phosphorous based epoxy resin, and the like.

Blends of various epoxy-containing materials can also be utilized. Suitable blends can include two or more weight average molecular weight distributions of epoxy-containing compounds such as low molecular weight epoxides (e.g., having a weight average molecular weight below 200 g/mole), intermediate molecular weight epoxides (e.g., having a weight average molecular weight in the range of about 200 to 1000 g/mole), and higher molecular weight epoxides (e.g., having a weight average molecular weight above about 1000 g/mole). Alternatively, or additionally, the epoxy resin can contain a blend of epoxy-containing materials having different chemical natures such as aliphatic and aromatic or different functionalities such as polar and nonpolar.

In one embodiment, the first part of the two-part composition comprises at least one bisphenol (e.g., A) epoxy resin. Bisphenol (e.g., A) epoxy resins are formed from reacting epichlorohydrin with bisphenol A to form diglycidyl ethers of bisphenol A. The simplest resin of this class is formed from reacting two moles of epichlorohydrin with one mole of bisphenol A to form the bisphenol A diglycidyl ether (commonly abbreviated to DGEBA or BADGE). DGEBA resins are transparent colorless-to-pale-yellow liquids at ambient temperature, with viscosity typically in the range of 5 to 15 Pa·s at 25° C. (77° F.). Industrial grades normally contain some distribution of molecular weight, since pure DGEBA shows a strong tendency to form a crystalline solid upon storage at ambient temperature. This same reaction can be conducted with other bisphenols, such as bisphenol F. The choice of the epoxy resin used depends upon the end use for which it is intended. Epoxides with flexibilized backbones may be desired where a greater amount of ductility is needed in the bond line. Materials such as diglycidyl ethers of bisphenol A and diglycidyl ethers of bisphenol F can provide desirable structural adhesive properties that these materials attain upon curing, while hydrogenated versions of these epoxies may be useful for compatibility with substrates having oily surfaces.

Aromatic epoxy resins can also be prepared by reaction of aromatic alcohols such as biphenyl diols and triphenyl diols and triols with epichlorohydrin. Such aromatic biphenyl and triphenyl epoxy resins are not bisphenol epoxy resins.

There are two primary types of aliphatic epoxy resins, i.e. glycidyl epoxy resins and cycloaliphatic epoxides. Glycidyl epoxy resins are typically formed by the reaction of epichlorohydrin with aliphatic alcohols or polyols to give glycidyl ethers or aliphatic carboxylic acids to give glycidyl esters. The resulting resins may be monofunctional (e.g., dodecanol glycidyl ether), difunctional (diglycidyl ester of hexahydrophthalic acid), or higher functionality (e.g. trimethylolpropane triglycidyl ether). Cycloaliphatic epoxides contain one or more cycloaliphatic rings in the molecule to which the oxirane ring is fused (e.g., 3,4-epoxycyclohexylmethyl-3,4-epoxycyclohexane carboxylate). They are formed by the reaction of cyclo-olefins with a peracid, such as peracetic acid. These aliphatic epoxy resins typically display low viscosity at ambient temperature (10 to 200 mPas) and are often used as reactive diluents. As such, they are employed to modify (reduce) the viscosity of other epoxy resins. This has led to the term 'modified epoxy resin' to denote those containing viscosity-lowering reactive diluents. In some embodiments, the resin composition may further comprise a reactive diluent. Examples of reactive diluents include diglycidyl ether of 1, 4 butanediol, diglycidyl ether of cyclohexane dimethanol, diglycidyl ether of resorcinol, p-tert-butyl phenyl glycidyl ether, cresyl glycidyl ether, diglycidyl ether of neopentyl glycol, triglycidyl ether of trimethylolethane, triglycidyl ether of trimethylolpropane, triglycidyl p-amino phenol, N,N'-diglycidylaniline, N,N,N',N',-tetraglycidyl meta-xylylene diamine, and vegetable oil polyglycidyl ether. The resin composition may comprise at least 1, 2, 3, 4, or 5 wt.-% and typically no greater than 15 or 20 wt-% of such reactive diluent(s).

In some embodiments, the resin composition comprises (e.g., bisphenol A) epoxy resin in an amount of at least about 50 wt.-% of the total resin composition including the mixture of boron nitride particles and cellulose nanocrystals. In some embodiments, the amount of (e.g., bisphenol A) epoxy resin is no greater than 95, 90, 80, 85, 80, 75, 70, or 65 wt.-% of the total resin composition.

Epoxies are typically cured with stoichiometric or near-stoichiometric quantities of curative. In the case of two-part epoxy compositions, the second part comprises the curative, also referred to herein as the curing agent. The equivalent weight or epoxide number is used to calculate the amount of co-reactant (hardener) to use when curing epoxy resins. The epoxide number is the number of epoxide equivalents in 1 kg (2.2 lbs) of resin (eq/kg); whereas the equivalent weight is the weight in grams of resin containing 1 mole equivalent of epoxide (g/mol). Equivalent weight (g/mol)=1000/epoxide number (eq/kg).

Common classes of curatives for epoxy resins include amines, amides, ureas, imidazoles, and thiols. In typical embodiments, the curing agent comprises reactive-NH groups or reactive —$NR^1R^2$ groups wherein $R^1$ and $R^2$ are independently H or $C_1$ to $C_4$ alkyl, and most typically H or methyl.

The curing agent is typically highly reactive with the epoxide groups at ambient temperature. Such curing agents are typically a liquid at ambient temperature. However, the first curing agent can also be a solid provided it has an activation temperature at or below ambient temperature.

One class of curing agents are primary, secondary, and tertiary polyamines. The polyamine curing agent may be straight-chain, branched, or cyclic. In some favored embodiments, the polyamine crosslinker is aliphatic. Alternatively, aromatic polyamines can be utilized.

Useful polyamines are of the general formula $R^5$—$(NR^1R^2)_x$ wherein $R_1$ and $R^2$ are independently H or alkyl, $R^5$ is a polyvalent alkylene or arylene, and x is at least two. The alkyl groups of $R^1$ and $R^2$ are typically $C_1$ to $C_{18}$ alkyl, more typically $C_1$ to $C_4$ alkyl, and most typically methyl. $R^1$ and $R^2$ may be taken together to form a cyclic amine. In some embodiment x is two (i.e. diamine). In other embodiments, x is 3 (i.e. triamine). In yet other embodiments, x is 4.

Examples include hexamethylene diamine; 1,10-diaminodecane; 1,12-diaminododecane; 2-(4-aminophenyl)ethylamine; isophorone diamine; 4,4'-diaminodicyclohexylmethane; and 1,3-bis(aminomethyl)cyclohexane. Illustrative six member ring diamines include for example piperzine and 1,4-diazabicyclo[2.2.2]octane ("DABCO").

Other useful polyamines include polyamines having at least three amino groups, wherein the three amino groups are primary, secondary, or a combination thereof. Examples include 3,3'-diaminobenzidine, hexamethylene triamine, and triethylene tetramine.

The specific composition of the epoxy resin can be selected based on its intended end use. For example, in one embodiment, the resin composition can be for insulation, as described in US 2014/0080940, the disclosure of which is incorporated herein by reference thereto.

The resin composition may optionally further comprise additives including (e.g. silane-treated or untreated) fillers, anti-sag additives, thixotropes, processing aids, waxes, and UV stabilizers. Examples of typical fillers include glass bubbles, fumed silica, mica, feldspar, and wollastonite. In some embodiments, the resin composition further comprises other thermally conductive fillers such as aluminum oxide, aluminum hydroxide, fused silica, zinc oxide, aluminum nitride, silicon nitride, magnesium oxide, beryllium oxide, diamond, and copper.

Two Part Methyl Methacrylates (MMA) Adhesives

Two-part methyl methacrylates (MMA) adhesives have a faster strength build up than epoxies. MMA adhesives are commonly used for bonding plastics and bonding metals to plastics. They are also extremely effective in joining solid surface materials together, and as they can be colored, they are used extensively in worktop manufacture and installation.

Methyl methacrylate adhesives are structural acrylic adhesives that are made of a Part A (Part 1) resin and Part B (Part 2) hardener. Most MMAs also contain rubber and additional strengthening agents. MMAs cure quickly at room temperature and have full bond strength soon after application. The adhesive is resistant to shear, peel, and impact stress. Looking at the bonding process more technically, these adhesives work by creating an exothermic polymerization reaction. Polymerization is the process of reacting monomer molecules together, in a chemical reaction, to form polymer chains. What this means is that the adhesives create a strong bond while still being flexible. These adhesives are able to form bonds between dissimilar materials with different flexibility, like metal and plastic. Unlike some other structural adhesives like two-part epoxies, MMAs do not require heat to cure. There are MMAs available with a range of working times to suit specific needs.

MMAs develop strength faster allowing parts to be used sooner. It is also worth noting the different processing conditions used for MMAs. For example, the two components of MMAs can each be applied separately to one of the materials being bonded together, and the MMA will not begin to cure until the joints are brought together, combining the components. This means that you do not have to deal with precise mixing ratios to get a good bond. It is important to remember that MMAs do tend to have a strong smell, meaning you should have good ventilation when applying them and they are flammable, so some care is needed.

MMAs are formulated to have a Work Life between 5 minutes and 20 minutes.

Generally, all of these acrylic structural adhesive types provide exceptional bond strength and durability—nearly that of epoxy adhesives—but with the advantages of having faster cure speed, being less sensitive to surface preparation, and bonding more types of materials Two Part Silicone Adhesives Two-part silicone adhesives are generally used when there is a large bond area or when there is not enough relative humidity to complete the cure. Common applications for these are; electronics applications including the manufacture of household appliances, in automotive and window manufacture.

Suitable silicone resins include moisture-cured silicones, condensation-cured silicones, and addition-cured silicones, such as hydroxyl-terminated silicones, silicone rubber, and fluoro-silicone. Examples of suitable commercially available silicone PSA compositions comprising silicone resin include Dow Corning's 280A, 282, 7355, 7358, 7502, 7657, Q2-7406, Q2-7566 and Q2-7735; General Electric's PSA 590, PSA 600, PSA 595, PSA 610, PSA 518 (medium phenyl content), PSA 6574 (high phenyl content), PSA 529, PSA 750-D1, PSA 825-D1, and PSA 800-C. An example of two-part silicone resin commercially available is that sold under the trade designation "SILASTIC J" from Dow Chemical Company, Midland, Mich.

Two Part Urethane Adhesives

Two-part urethane adhesives can be formulated to have a wide range of properties and characteristics when cured. They are often used when bonding dissimilar materials such as glass to metal or aluminum to steel, for example.

Most polyurethane adhesives are either polyester or polyether based. They are present in the isocyanate prepolymers and in the active hydrogen containing hardener component (polyol). They form the soft segments of the urethane, whereas the isocyanate groups form the hard segments. The soft segments usually comprise the larger portion of the elastomeric urethane adhesive and, therefore, determine its physical properties. For example, polyester-based urethane adhesives have better oxidative and high temperature stability than polyether-based urethane adhesives, but they have lower hydrolytic stability and low-temperature flexibility. However, polyethers are usually more expensive than polyesters.

Many urethane adhesives are sold as two-component urethane adhesives. The first component contains the diisocyanates and/or the isocyanate prepolymers (Part 1), and the second consists of polyols (and amine/hydroxyl chain extenders) (Part 2). A catalyst is often added, usually a tin salt or a tertiary amine, to speed up cure. The reactive ingredients are often blended with additives, and plasticizers to achieve the desired processing and/or final properties, and to reduce cost.

Polyurethanes may be prepared, for example, by the reaction of one or more polyols and/or polyamines and/or aminoalcohols with one or more polyisocyanates, optionally in the presence of non-reactive component(s). For applications where weathering is likely, it is typically desirable for the polyols, polyamines, and/or aminoalcohols and the polyisocyanates to be free of aromatic groups.

Suitable polyols include, for example, materials commercially available under the trade designation DESMOPHEN from Bayer Corporation, Pittsburgh, Pa. The polyols can be polyester polyols (for example, Desmophen 631A, 650A, 651A, 670A, 680, 110, and 1150); polyether polyols (for example, Desmophen 550U, 1600U, 1900U, and 1950U); or acrylic polyols (for example, Demophen A160SN, A575, and A450BA/A).

Suitable polyamines include, for example: aliphatic polyamines such as, for example, ethylene diamine, 1,2-diaminopropane, 2,5-diamino-2,5-dimethylhexane, 1,11-diaminoundecane, 1,12-diaminododecane, 2,4- and/or 2,6-hexahydrotoluylenediamine, and 2,4'-diamino-dicyclohexylmethane; and aromatic polyamines such as, for example, 2,4- and/or 2,6-diaminotoluene and 2,4'- and/or 4,4'-diaminodiphenylmethane; amine-terminated polymers such as, for example, those available from Huntsman Chemical (Salt Lake City, Utah), under the trade designation JEFFAMINE polypropylene glycol diamines (for example, Jeffamine XTJ-510) and those available from Noveon Corp., Cleveland, Ohio, under the trade designation Hycar ATBN (amine-terminated acrylonitrile butadiene copolymers), and those disclosed in U.S. Pat. No. 3,436,359 (Hubin et al.) and U.S. Pat. No. 4,833,213 (Leir et al.) (amine-terminated polyethers, and polytetrahydrofuran diamines); and combinations thereof.

Suitable aminoalcohols include, for example, 2-aminoethanol, 3-aminopropan-1-ol, alkyl-substituted versions of the foregoing, and combinations thereof.

Suitable polyisocyanate compounds include, for example: aromatic diisocyanates (for example, 2,6-toluene diisocyanate; 2,5-toluene diisocyanate; 2,4-toluene diisocyanate; m-phenylene diisocyanate; p-phenylene diisocyanate; methylene bis(o-chlorophenyl diisocyanate); methylenediphenylene-4,4'-diisocyanate; polycarbodiimide-modified methylenediphenylene diisocyanate; (4,4'-diisocyanato-3,3',5,5'-tetraethyl) diphenylmethane; 4,4'-diisocyanato-3,3'-dimethoxybiphenyl (o-dianisidine diisocyanate); 5-chloro-2,4-toluene diisocyanate; and 1-chloromethyl-2,4-diisocyanato benzene), aromatic-aliphatic diisocyanates (for example, m-xylylene diisocyanate and tetramethyl-m-xylylene diisocyanate); aliphatic diisocyanates (for example, 1,4-diisocyanatobutane; 1,6-diisocyanatohexane; 1,12-diisocyanatododecane; and 2-methyl-1,5-diisocyanatopentane); cycloaliphatic diisocyanates (for example, methylenedicyclohexylene-4,4'-diisocyanate; 3-isocyanatomethyl-3,5,5-trimethylcyclohexyl isocyanate (isophorone diisocyanate); 2,2,4-trimethylhexyl diisocyanate; and cyclohexylene-1,4-diisocyanate), polymeric or oligomeric compounds (for example, polyoxyalkylene, polyester, polybutadienyl, and the like) terminated by two isocyanate functional groups (for example, the diurethane of toluene-2,4-diisocyanate-terminated polypropylene oxide glycol); polyisocyanates commercially available under the trade designation MONDUR or DESMODUR (for example, Desmodur XP7100 and Desmodur N 3300A) from Bayer Corporation (Pittsburgh, Pa.); and combinations thereof.

In some embodiments, the polyurethane comprises a reaction product of components comprising at least one polyisocyanate and at least one polyol. In some embodiments, the polyurethane comprises a reaction product of components comprising at least one polyisocyanate and at least one polyol. In some embodiments, the at least one polyisocyanate comprises an aliphatic polyisocyanate. In some embodiments, the at least one polyol comprises an aliphatic polyol. In some embodiments, the at least one polyol comprises a polyester polyol or a polycarbonate polyol.

Typically, the polyurethane(s) is/are extensible and/or pliable. For example, the polyurethane(s), or any layer containing polyurethane, may have a percent elongation at break (at ambient conditions) of at least 10, 20, 40, 60, 80, 100, 125, 150, 175, 200, 225, 250, 275, 300, 350, or even at least 400 percent, or more.

In certain embodiments, the polyurethane has hard segments, typically segments corresponding to one or more polyisocyanates, in any combination, in an amount of from 35, 40, or 45 percent by weight up to, 50, 55, 60, or even 65 percent by weight.

As used herein: wt % means percent by weight based on the total weight of material, and Hard Segment wt %=(weight of short chain diol and polyol+weight of short chain di- or polyisocyanate)/total weight of resin wherein: short chain diols and polyols have an equivalent weight≤185 g/eq, and a functionality≥2; and short chain isocyanates have an equivalent weight≤3 20 g/eq and a functionality≥2.

One or more catalysts are typically included with two-part urethanes. Catalysts for two-part urethanes are well known and include, for example, aluminum-, bismuth-, tin-, vanadium-, zinc-, tin-, and zirconium-based catalysts. Tin-based catalysts have been found to significantly reduce the amount of outgassing during formation of the polyurethane. Examples of tin-based catalysts include dibutyltin compounds such as dibutyltin diacetate, dibutyltin dilaurate, dibutyltin diacetylacetonate, dibutyltin dimercaptide, dibutyltin dioctoate, dibutyltin dimaleate, dibutyltin acetonylacetonate, and dibutyltin oxide. If present, any catalyst is typically included at levels of at least 200 parts per million by weight (ppm), 300 ppm, or more; however, this is not a requirement.

Additional suitable two-part urethanes are described in U.S. Pat. No. 6,258,918 B1 (Ho et al.) and U.S. Pat. No. 5,798,409 (Ho), the disclosures of which are incorporated herein by reference.

In general, the amounts of polyisocyanate to polyol, polyamine, and/or aminoalcohol in a two-part urethane are selected in approximately stoichiometrically equivalent amounts, although in some cases it may be desirable to adjust the relative amounts to other ratios. For example, a slight stoichiometric excess of the polyisocyanate may be useful to ensure a high degree of incorporation of the polyol, polyamine, and/or aminoalcohol, although any excess isocyanate groups present after polymerization will typically react with materials having reactive hydrogens (for example, adventitious moisture, alcohols, amines, etc.).

Combining the Parts

In some embodiments, methods include causing the multipart structural adhesive to be formed by combining the Part 1 and the Part 2. Additionally, one or more of the Parts (e.g., one or more of the Part 1 and the Part 2) can be composed of sub-Parts. Additionally, more than two Parts (e.g., a Part 1, Part 2, Part 3, etc.) can be utilized to form the adhesive. In such embodiments, the Part 1 can be combined with the first sub-Part 2, the second sub-Part 2 (or vice versa, and alternatively so on). In some embodiments, the first sub-Part 2 can be combined with the second sub-Part 2 before being combined with the Part 1. In some such embodiments, the first sub-Part 2 and the second sub-Part 2 are combined to form the Part 2 in automated dispensing equipment, and in some such embodiments, the first sub-Part 2 and the second sub-Part 2 are combined to form the Part 2 in a handheld dispenser. In some such embodiments, the first sub-Part 2 and the second sub-Part 2 can be mixed in a mixing nozzle. In some embodiments, the Part 1, the first sub-Part 2 and the second sub-Part 2 are simultaneously combined.

In some embodiments, Part 1 comprises a curable resin and the Part 2 comprises a curing agent. In some embodiments, the opposite is the case, such that Part 1 comprises a curing agent and the Part 2 comprises a curable resin.

In some embodiments, where the Part 2 is composed of two components, e.g., from a first sub-part 2 and a second sub-Part 2, the ratio of the first sub-Part 2 to the second sub-Part 2 is from 100:1 to 1:1, from 10:1 to 1:1, from 4:1 to 1:1, or even from 2:1 to 1:1.

In some embodiments, where the Part 1 is composed of two components, e.g., from a first sub-part 1 and a second sub-Part 1 the ratio of the first sub-Part 1 to the second sub-Part 1 is from 100:1 to 1:1, from 10:1 to 1:1, from 4:1 to 1:1, or even from 2:1 to 1:1.

In some embodiments, the ratio of the Part 1 to the combination of the first sub-Part 2 and the second sub-Part 2 is from 100:1 to 1:1, from 10:1 to 1:1, from 4:1 to 1:1, or even from 2:1 to 1:1.

In some embodiments, the ratio of the Part 2 to the combination of the first sub-Part 1 and the second sub-Part 1 is from 100:1 to 1:1, from 10:1 to 1:1, from 4:1 to 1:1, or even from 2:1 to 1:1.

In some embodiments, a Part 2 (for example) that was formed from two (or more) sub-Parts can be stable and could be either stored in a reservoir or could be inline processed on automated dispensing equipment. In this case, the formed Part 2 can then be used and dispensed as a standard Part 2 in a standard automated process. The concept of customizing the Work Life of a two-part structural adhesive can easily be added to an automated dispenser system with the addition of a separate mixing station.

Generally, the two components of a two-part adhesive can be mixed prior to being applied to the substrates to be bonded. After mixing, the two-part adhesive gels, reaches a desired handling strength, and ultimately achieves a desired final strength. Some two-part adhesives must be exposed to elevated temperatures to cure, or at least to cure within a desired time. However, it may be desirable to provide structural adhesives that do not require heat to cure (e.g., room temperature curable adhesives), yet still provide high performance in peel, shear, and impact resistance.

Kits

Disclosed herein are also kits that include handheld delivery devices such as those discussed above and at least two flexible containment vessels containing a Part 1 composition and a Part 2 composition, as discussed above. The amounts, ratios or both of the Part 1 and the Part 2 compositions are controlled by the handheld delivery device, and the amounts, ratios, or both of the Part 1, and the Part 2 affect one or more properties of the multipart structural adhesive composition.

Different types of components could be packaged together in kits to provide a consumer access to adhesives having variable types of properties depending on the particular application that the consumer may want to use the adhesive for.

For example, a particular illustrative kit could provide a consumer with a single handheld delivery device and a sufficient number and types of materials within flexible containment vessels that could be utilized for any of the structural adhesive needs that a consumer engaged in a particular industry might need. Alternatively, another particular illustrative kit could provide a consumer a sufficient number and types of materials within flexible containment vessels that could be utilized for any of the structural adhesive needs that a consumer engaged in a particular industry might need, the assumption being that the consumer already has the handheld delivery device. Alternatively, another particular illustrative kit could provide a consumer with a single handheld delivery device, a sufficient number and types of materials within flexible containment vessels that could be utilized for any of the structural adhesive needs that a consumer engaged in a particular industry might need, spare parts for the handheld delivery device, optional mixing tips, additional adhesive delivery channels, additional outlet manifolds, carrying cases for the handheld delivery device, carrying cases for the handheld delivery device and other optional components, or any combinations thereof.

Additional Components

The disclosed methods, systems and devices can be very useful to high volume applications requiring larger quantities. In these applications, handheld dispensers may be impractical due to large quantities used or being part of an automated manufacturing line. Automated dispensing equipment can be used to control the amounts of the two parts and then the two parts can be dispensed through a mixing tip to form the two-part (for example) adhesive. Any or all of these concepts could be incorporated into handheld delivery devices as disclosed herein.

Various companies can provide various components, systems, etc. that can be capable of electronically controlling and mixing Parts 1 and 2 (or more) of a two-part structural adhesive and could additionally provide for mixing of one or more of those Parts that may have sub-Parts that need to be mixed as well. For example, a system can be configured and programmed to control the dispense time (e.g., milliseconds), the volume of the materials (e.g., in milliliters), or the weight of the material (e.g., in grams), or any combination thereof. Additionally, the ratios of Part 1 and Part 2 (for example) can also be controlled, programmed, or both. In some embodiments, the amounts, ratios, or both of the various Parts, sub-Parts, or both being dispensed can be controlled to ±1% (volumetric, for example). Any or all of these concepts could be incorporated into handheld delivery devices as disclosed herein.

In some embodiments, piston pumps can be utilized. Piston pumps can be useful because they can be fitted and designed to include both metering and mixing dispensing equipment. Piston pumps can also be electronically controlled using a programmable or programmed controller. Any or all of these concepts could be incorporated into handheld delivery devices as disclosed herein.

Illustrative commercially available systems can include, for example Nordson EFD's 797PCP-2K series progressive cavity pump system (Nordson Corporation Inc., Wixom, MI, USA), which provides volumetric meter mix dispensing for two-part fluids. Various optional components that can be utilized with the Nordson EFD cavity pumps can include, for example mixers (e.g., Series 190 Spiral Bayonet Mixers, Series 295 Square Turbo Bayonet Mixers), controllers (e.g., 7197PCP Controllers), and additional components not specifically disclosed or referred to herein. An additional optional component that can be utilized along with the pump system above, or other pump systems can include a bulk unloader, for example for loading a Part 1 and a Part 2 into a pump system such as that noted above as being commercially available can include Rhino Bulk Unloader (Nordson Corporation Inc., Wixom, MI, USA)

In some embodiments, gear pump metering and mixing dispensing equipment may be preferable for lower viscosity adhesives and may be especially useful in fully automated high production environments. Any or all of these concepts could be incorporated into handheld delivery devices as disclosed herein.

Automated or programmable pumps such as piston pumps, gear pumps, etc. can also be useful because they can optionally be controlled to vary the amounts, ratios, or components as the structural adhesive is being formed and utilized. For example, the amount of one Part (or vice versa) can be varied during application by an automated system to account for various environmental parameters (e.g., temperature, humidity, etc.), to form a structural adhesive having at least one different property than the structural adhesive that was formed before varying the amount, ratio or both of the specific Part of the composition, to create a structural adhesive that has at least one changing property for use in a specific application, or any combination thereof (or for other reasons not specifically indicated herein). Any or all of these concepts could be incorporated into handheld delivery devices as disclosed herein.

In some embodiments, illustrative systems that can be used along with disclosed structural adhesives to control, vary, or both various amounts of components (e.g., Part 1, Part, 2, sub-Parts 1, sub-Parts 2, additives, etc.) can include devices, components, systems, etc. disclosed in EP Application Serial No. 20186305.7 (also PCT application number IB2021/056362). Such systems can offer the advantage of changing one or more properties of the structural adhesive while it is being dispensed. Some such systems can additionally utilize sensors that measure one or more properties of the adhesive and utilize such measurements, at least in part, to control the amounts, ratios, or both of the various components. Any or all of these concepts could be incorporated into handheld delivery devices as disclosed herein.

In some disclosed embodiments, such systems can include, for example: property sensors for determining a property value of a property of a liquid, such as a two-component curable adhesive, the property sensor comprising a channel comprising a sensing zone through which—in use—the liquid flows; two electrodes for generating an electric field of one or more sensing frequencies in the sensing zone; a data storage device comprising a pre-stored set of calibration data representing calibration impedance responses measured previously at the one or more sensing frequencies and at different property values of the property of an identical liquid; and a property value deriver, electrically connected to the electrodes, and operable to repeatedly generate, while the liquid flows through the sensing zone, between the electrodes an electric field of the one or more sensing frequencies in the sensing zone; sense between the electrodes, at the one or more sensing frequencies, while the liquid flows through the sensing zone and while the electric field is present, a response impedance; and derive from the response impedance a property value of the property of the liquid, using the pre-stored set of calibration data representing calibration impedance responses. Any or all of these concepts could be incorporated into handheld delivery devices as disclosed herein.

In some embodiments, the channel can comprise a first longitudinal section having a first open cross section available for the flow of the liquid, and a second longitudinal section, downstream from the first longitudinal section, having a second open cross section available for the flow of the liquid, wherein the second open cross section is larger than the first open cross section, and wherein the sensing zone is comprised in the second longitudinal section. In some embodiments, the channel may comprise a bypass, arranged such that a first portion of the liquid flows through the sensing zone, and a second portion of the liquid flows through the bypass bypassing the sensing zone. Any or all of these concepts could be incorporated into handheld delivery devices as disclosed herein.

In some embodiments, one or both of the electrodes is/are arranged such as to be in contact with the liquid when the liquid flows through the sensing zone. In some such embodiments, the sensing zone can be arranged between the electrodes. In some such embodiments, one of the electrodes is arranged between the sensing zone and the bypass. Any or all of these concepts could be incorporated into handheld delivery devices as disclosed herein.

In some embodiments such a system can comprise a temperature sensor for sensing a temperature of the liquid in the channel or in the sensing zone. In some embodiments such a system can comprise a flow speed sensor for sensing a flow speed of the liquid through the channel or through the sensing zone. Any or all of these concepts could be incorporated into handheld delivery devices as disclosed herein.

Some such systems can provide sensor enabled mixing by utilizing a system that comprises a mixing device for mixing two or more components (A, B) to produce a mixed liquid at a mixer output, and a property sensor such as those described above, in fluid communication with the mixer output such that the mixed liquid can flow from the mixer output through the sensing zone. Any or all of these concepts could be incorporated into handheld delivery devices as disclosed herein.

Also provided herein and by such systems are processes of determining a property value of a property of a liquid, comprising the steps, in this sequence, of providing a liquid and a property sensor such as those described above, and having the liquid flow through the sensing zone; generating, while the liquid flows through the sensing zone, between the electrodes an electric field of the one or more sensing frequencies in the sensing zone; sensing between the electrodes, at the one or more sensing frequencies, while the liquid flows through the sensing zone and while the electric field is present, a response impedance; and deriving from the response impedance a property value of the property of the liquid, using the pre-stored set of calibration data representing calibration impedance responses. Any or all of these concepts could be incorporated into handheld delivery devices as disclosed herein.

In some embodiments, such processes can utilize sensing frequencies at a frequency of between 1 Hertz and 10000 Hertz, and wherein the amplitude of the electric field is between 100 Volt per meter and 20000 Volt per meter. Any or all of these concepts could be incorporated into handheld delivery devices as disclosed herein.

In some such embodiments, the liquid has a dynamic viscosity of between 10 Pascalseconds and 40,000.0 Pascalseconds, measured at 25° C. according to standard ASTM D7042-12a in its version in force on 1 Jul. 2020.

Additionally, such methods, systems or both may provide a set or sets of calibration data. Illustrative sets of calibration data representing calibration impedance responses for use in the process described above can include those wherein the set of calibration data further represents a property value of a property of a calibration liquid at which property value one of the calibration impedance response was sensed. In some such cases, the set of calibration data representing calibration impedance responses discussed immediately above, wherein the set of calibration data further represents a sensing frequency at which sensing frequency one of the calibration impedance responses was sensed, and/or wherein the set of calibration data further represents a temperature of the liquid in the sensing zone at which temperature one of the calibration impedance responses was sensed. Any or all of these concepts could be incorporated into handheld delivery devices as disclosed herein.

Processor Controlled System and Method for Formulating Multiple Structural Adhesives Using a Limited Number of Components Disclosed systems and methods could be controlled and/or programmed, for example by a programmable logic controller (PLC) to dispense the desired adhesive formulation based on a customer's requirements—for example, desired physical properties for an application (i.e. working life, adhesion, strength, etc.). The dispensing system could be supplied with multiple Parts 1, Parts 2, sub-Parts 1, sub-Parts 2, compatible additives, or any combinations thereof based on the specific adhesive system, application requirements, or combinations thereof. Once the required properties were selected, the PLC could determine a formulation that would provide those properties based on the right combination of Parts, sub-Parts, compatible additives, or any combinations thereof. The combination could be based on past design of experiment (DOE) results and artificial intelligence and machine learning (AI/ML) technology, for example. Because structural adhesive performance is impacted by chemistry and stoichiometry of the adhesive, the computer would control the amount of each of the components needed to provide the desired adhesive performance properties and then determine the right amounts of each to have the right stoichiometry. These components would be dispensed and thoroughly mixed in the right amounts for the desired adhesive performance properties. Any or all of these concepts could be incorporated into handheld delivery devices as disclosed herein.

The structural adhesive performance properties are based on the Part 1 and Part 2 compositions used. Part 1 can be made up of a combination of two or more compatible sub-part 1s, Part 2 could be made up of two or more compatible sub-parts 2, or any combination thereof. In some embodiments, each of the parts (sub-parts, or any combination thereof) can provide and impact one or more specific performance properties. In addition, other additives could be added based on the specific application needs and requirements such as color/pigments, UV and antioxidant stabilizers, fillers, etc., for example. Therefore, the adhesive formulation could be formed by combining more than three components based on the application requirements. For more complicated structural adhesive applications, the dispensing system could allow even additional inputs to meet all customer needs. Any or all of these concepts could be incorporated into handheld delivery devices as disclosed herein.

Embodiments

Embodiment 1 comprises a system for dispensing an adhesive, the system comprising: a chamber that holds at least two flexible containment vessels, the at least two flexible containment vessels holding at least a part 1 and a part 2; at least two adhesive delivery channels, a first adhesive delivery channel connected to the containment vessel to receive part 1 and a second adhesive delivery channel connected to the containment vessel to receive part 2; a motor; at least a first variable positive displacement pump wherein the first variable positive displacement pump is actuated by the motor; and a mixing tip designed to receive part 1 and part 2 from the at least two adhesive delivery channels, mix at least part 1 and part 2 together and dispense the adhesive through a dispensing end, wherein when in operation, the at least part 1, part 2, or mixtures thereof are only in contact with the at least two flexible containment vessels, the at least two adhesive delivery channels and the mixing tip, wherein the at least one variable positive displacement pump forces the at least part 1 and at least part 2 respectively through the first adhesive delivery channel and the second adhesive delivery channel to the dispensing end of the mixing tip.

Embodiment 2 is a system according to Embodiment 1 further comprising a compressive element configured to apply external positive pressure to the at least two flexible containment vessels in the chamber to force the part 1 and part 2 from the at least two flexible containment vessels through the adhesive delivery channel.

Embodiment 3 is a system according to any of the preceding Embodiments, wherein the chamber holds more than two flexible containment vessels, or even four flexible containment vessels.

Embodiment 4 is a system according to any of the preceding Embodiments, wherein the chamber further comprises an outlet manifold, wherein the at least two flexible containment vessels are fluidly connected to the outlet manifold.

Embodiment 5 is a system according to any of the preceding Embodiments further comprising a compressive element that applies uniform pressure over the entire surfaces of the at least two flexible containment vessels.

Embodiment 6 is a system according to any of the preceding Embodiments, wherein the amount of pressure applied and dimensions of the outlet manifold are designed so that negative pressure is not needed to meter and flow part 1 and part 2 from the first and second flexible containment vessels.

Embodiment 7 is a system according to any of the preceding Embodiments, wherein there is a linear relationship between flow rate in milliliters (mL)/second(s) (ml/s) versus pressure (Bars).

Embodiment 8 is a system according to any of the preceding Embodiments, the chamber further comprising pressure transducers to control and maintain desired pressure in the chamber during use of the system.

Embodiment 9 is a system according to any of the preceding Embodiments, wherein the first adhesive delivery channel and the second adhesive delivery channel comprise a first and a second tube respectively upon with the at least first variable positive displacement pump acts.

Embodiment 10 is a system according to any of the preceding Embodiments, wherein the relative ratios of the inner diameters of the first and second tubes can be changed to allow for different ratios of part 1 and part 2, respectively.

Embodiment 11 is a system according to any of the preceding Embodiments, wherein the outer wall thickness of the first and second tubes are constant.

Embodiment 12 is a system according to any of the preceding Embodiments, wherein the outer wall thickness of the first and second tubes vary.

Embodiment 13 is a system according to any of the preceding Embodiments, wherein the first and second tube always have at least one section completely squeezed shut to prevent back flow during operation of the at least first variable positive displacement pump.

Embodiment 14 is a system according to any of the preceding Embodiments, wherein dispensing is prevented when the pump is not acting upon the first and second tube.

Embodiment 15 is a system according to any of the preceding Embodiments, wherein the first and second tubes are constrained by a first and second tube holder in the at least first variable positive displacement pump when acted upon by the pump.

Embodiment 16 is a system according to any of the preceding Embodiments, wherein the first and second tubes are acted upon by a compression element.

Embodiment 17 is a system according to any of the preceding Embodiments, further comprising a second variable positive displacement pump to act on the second adhesive delivery channel.

Embodiment 18 is a system according to any of the preceding Embodiments, wherein a metering element controls the first and the second variable positive displacement pumps and the metering element is controlled by an electronic processor.

Embodiment 19 is a system according to any of the preceding Embodiments, wherein the variable positive displacement pump(s) are selected from: rotary peristaltic pumps, linear peristaltic pumps, rotary lobe pumps, progressive cavity pumps, rotary gear pumps, piston pumps, diaphragm pumps, screw pumps, gear pumps, hydraulic pumps, and rotary vane pumps.

Embodiment 20 is a system according to any of the preceding Embodiments, wherein the variable positive displacement pump(s) are a linear peristaltic pump.

Embodiment 21 is a system according to any of the preceding Embodiments, wherein the linear peristaltic pump comprises a cam shaft driven by the at least one motor through the center of a housing that rotates to actuate moving elements within.

Embodiment 22 is a system according to any of the preceding Embodiments, wherein the moving elements are disks.

Embodiment 23 is a system according to any of the preceding Embodiments, wherein there is a small overlap in adjacent disks to prevent loss of pressure/leak through the first and second adhesive delivery channels.

Embodiment 24 is a system according to any of the preceding Embodiments, wherein there is at least three disks, at least 5 disks, at least 8 disks, or at least 10 disks.

Embodiment 25 is a system according to any of the preceding Embodiments, wherein a single revolution of the shaft presses all of the disks against the tubes.

Embodiment 26 is a system according to any of the preceding Embodiments, wherein the moving elements are flexible spring members.

Embodiment 27 is a system according to any of the preceding Embodiments, wherein the cam shaft of the linear peristaltic pump acts on the tube(s).

Embodiment 28 is a kit for dispensing multipart structural adhesives, the kit comprising: a system according to any of the preceding Embodiments; and at least a first flexible containment vessel holding a Part 1 composition and a second flexible containment vessel holding a Part 2 composition of a multipart structural adhesive, wherein the amounts, ratios, or both of the Part 1 and the Part 2 are controlled by the dispenser, and wherein the amounts, ratios, or both of the Part 1, and the Part 2 affect one or more properties of the multipart structural adhesive composition.

Embodiment 29 is a kit according to any of the preceding Embodiments further comprising alternative Part 1 compositions, alternative Part 2 compositions, or both.

Embodiment 30 is a kit according to any of the preceding Embodiments further comprising sub-Part 1 compositions, sub-Part 2 compositions, or both.

Embodiment 31 is a kit according to any of the preceding Embodiments further comprising alternative Part 1 compositions, alternative Part 2 compositions, sub-Part 1 compositions, sub-Part 2 compositions, or some combination thereof.

Embodiment 32 is a kit according to any of the preceding Embodiments, wherein the flexible containment vessels comprise a flexible laminate.

Embodiment 33 is a kit according to any of the preceding Embodiments, wherein the flexible containment vessels are continuous with the adhesive delivery channels.

Embodiment 34 is a kit according to any of the preceding Embodiments, wherein the adhesive delivery channels comprise a flexible laminate.

Embodiment 35 is a kit according to any of the preceding Embodiments, wherein the flexible laminate comprises structural layers, moisture blocking layers, UV resistant layers, or combinations thereof.

Embodiment 36 is a kit according to any of the preceding Embodiments, wherein the flexible containment vessels are refillable via application of negative pressure by a compressive element.

EXAMPLES

The following illustrative examples may aid in understanding the disclosure. However, the disclosure is not necessarily limited to these examples. Embodiments and concepts that are not specifically exemplified may have been disclosed.

Unless otherwise noted, all parts, percentages, ratios, etc. in the examples and the rest of the specification are by weight, and all materials used in the examples were obtained, or are available, from general suppliers such as, for example, Georgia-Pacific, Atlanta, GA, US. The following abbreviations are used herein: g=grams, kg=kilograms, m=meters, in=inches, μm=microns=10-6 m, min=minutes, hr=hours, kPa=kilopascals, MPa=megaPascals, J=Joules, ° C.=degrees Celsius, psi=pounds per square inch, ° F.=degrees Fahrenheit, N=Newtons, lbs-pounds.

Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows. All references cited in this disclosure are herein incorporated by reference in their entirety.

TABLE 1

Materials

| Abbreviation | Description and Source |
|---|---|
| SR349 | Ethoxylated (3) Bisphenol A Diacrylate, obtained from Sartomer Europe, Colombes Cedex, France under the trade designation SR349. |
| SR351 | Trimethyloylpropane Triacrylate, obtained from Sartomer Europe, Colombes Cedex, France under the trade designation SR351. |
| SR602 | Ethoxylated (10) Bisphenol A Diacrylate, obtained from Sartomer Europe, Colombes Cedex, France under the trade designation SR602. |
| SR9035 | Ethoxylated (15) Trimethyloylpropane Triacrylate, obtained from Sartomer Europe, Colombes Cedex, France under the trade designation SR9035. |
| AEP | 1-(2-Aminoethyl)piperazine, obtained from Huntsman Advanced Materials (Europe) BVBA, Bergkamen, Germany. |
| Epikote 828 | Bisphenol A diglycidyl ether, obtained from Hexion Specialty Chemicals GmbH, Duisburg, Germany under the trade designation Epikote 828. |
| ACMBA349 | Acrylate-based masterbatch prepared from SR349 and AEP |
| ACMBA351 | Acrylate-based masterbatch prepared from SR351 and AEP |
| ACMBA602 | Acrylate-based masterbatch prepared from SR602 and AEP |
| ACMBA9035 | Acrylate-based masterbatch prepared from SR9035 and AEP |

Testing Methods

Creep Performance Test

An MCR 302 rheometer (Anton Paar GmbH, Graz, Austria) was used to determine the creep properties and dimensional stability of the composition. A 0.6 mm (0.0236 inches) thick sample of each composition was loaded between 25 mm (0.984 inches) parallel plates, and a normal force (FN) of 1N (0.225 lbs force) was applied. A constant stress of 1000 Pa (0.145 psi) was applied for 300 seconds, and then a constant stress of 0 Pa was applied for 600 seconds. The strain (γ 300s) recorded in 300 seconds is used to characterize the creep behavior of the composition ("cold-flow") and expressed as % strain.

Rheology of Acrylic Copolymer

An MCR 302 rheometer (ANTON PAAR GmbH, Graz, Austria) was used to measure the glass transition temperature T g of the acrylic copolymer operating in an oscillation mode. The sample was loaded on an 8 mm (0.315 inch) parallel plate and a normal force of 0.1 N (0.0225 lbs force) applied. The sample was first cooled from 30° C. to −50° C. (86° F. to −58° F.) at 10° C. per minute (18° F. per minute), while the strain (γ) was reduced from 1% to 0.01%, and the normal force (FN) was increased from 0.1N to 0.5N. Then the sample was analyzed, and at this time, it was heated from −50° C. to 150° C. (−58° F. to 302° F.) at 10° C. per minute (18° F. per minute), while γ was increased from 0.01% to 5% and F N decreases from 0.5N to 0.05N. The oscillation frequency (F) was 1 Hz in all experiments. The temperature corresponding to the main peak of tan (δ) as Tg (unit: ° C.) was measured.

Dynamic Overlap Cut

The adhesion to e-coated steel plate ("stl") was determined by measuring the overlap shear strength of the bonded sample. The substrate test piece measuring 25 mm×50.8 mm (0.984 inch×2.0 inch) was wiped with a 1:1 (v:v) solution of isopropanol and water, and let to air dry. The release liner was removed from one side of the adhesive composition in a section of 12.7 mm×25 mm (0.50 inch×0.984 inch), and the composition was applied to a test piece.

The second release liner was removed and the composition exposed to a microwave source (0.9 to 1.2 J/cm 2 UVA, H bulb, Heraeus Noblelight America, Gaithersburg, MD), such as by UVICURE Plus integrating radiometer (EIT, Inc.), Sterling, VA). The second test piece was applied to the irradiated sample to seal the bond. The assembly was wet-out by applying a static load of 6 kg (13.2 lbs) to the sample for 30 to 60 seconds. The samples were cured for 24 hours at ambient temperature and humidity before testing.

Using an INSTRON tensile testing machine model 5581 (Instron Corp., Canton, Ma), a dynamic overlap shear test was performed at ambient temperature. The test sample was loaded into the fixture and the crosshead operated at 2.5 mm per minute (0.0984 inches per minute) to increase the load of the sample until it fails. The fracture stress was recorded in MPa.

Cracking Test

The adhesion of plastic to glass was determined by measuring the cracking strength of the bonded sample. The plastic test piece made of CRASTIN that measures 22 mm×28 mm×4 mm (0.866 inch×1.10 inch×0.1575 inch) was wiped with a 1:1 (v:v) solution of isopropanol and water, and strengthened glass that measures 127 mm×50 mm×4 mm (5.0 inch×1.97 inch×0.1575 inch) was let to air dry. The release liner was removed from a 22 mm×28 mm (0.866 inch×1.10 inch) section of the adhesive composition, and this section was applied to the plastic test piece. The soaking was accomplished by applying a weight of 1 to 3 kg (2.2 lbs to 6.6 lbs) to the test piece for 30 seconds. The second release liner was removed, and the adhesive was partially exposed to a microwave source (0.9 to 1.2 J/cm 2 UVA, H bulb, Heraeus Noblelight America, Gaithersburg, MD), such as by UVICURE Plus integrating radiometer (EIT, Inc., Sterling, VA). The irradiated sample was applied to a strengthened glass plate and saturated by applying a weight of 6 kg (13.2 lbs) to the bonded assembly for 30 to 60 seconds. The assembly was allowed to cure under ambient conditions for 24 hours before testing.

The cured assembly was installed vertically (that is, the bonding plane was vertically oriented) in an INSTRON tensile testing machine model 5565 (INSTRON CORP., Canton, MA). A 70 mm (2.76 inch) lever arm perpendicular was attached to the bonding plane to the plastic test piece and pulled up (parallel to the bonding plane) at a rate of 2.5 mm (0.0984 inches) per minute. The maximum value of fracture was recorded in units of N.

Gel Time

Gel times were measured at 25° C. (77° F.). with an ARES LS2 rheometer (TA Instruments), using a parallel plate configuration with 25 mm (0.984 inch) diameter plates and a 0.5 mm (0.0197 inch) gap. Measurements were made in dynamic mode at 1 Hz, starting at 5% strain. The autotension and autostrain settings were used to control the gap and torque during the measurement. After applying samples directly to the bottom plate, the gap was set and the test was started within 30 seconds. The time to reach the crossover point, i.e., the point where the storage modulus (G') value became greater than the loss modulus (G") value, was reported as the gel time.

Overlap Shear Adhesion

Test panels measuring 2.5 cm wide by 10.2 cm long (1 inch by 4 inches) of several different materials were used to evaluate overlap shear adhesion. The bonding surfaces of the panels were cleaned by lightly abrading them using a 3M SCOTCH-BRITE No. 86 scouring pad (green colored), followed by an isopropyl alcohol wipe to remove any loose debris. A bead of adhesive was then dispensed along one end of a test panel, about 6.4 mm (0.25 inch) from the end. The panels were joined together face to face along their length to provide an overlap bond area measuring approximately 1.3 cm long and 2.5 cm wide (0.5 inch by 1 inch). A uniform bond line thickness was provided by sprinkling a small amount of 0.2 mm (0.008 inch) diameter solid glass beads on the adhesive before joining the two test panels together. The bonded test panel samples were allowed to dwell at 23° C. (73.4° F.). (room temperature) for at least 48 hours to ensure full cure of the adhesive. The samples were tested at 22° C. (71.6° F.). for peak overlap shear strength at a separation rate of 2.5 mm/minute (0.1 inch/minute). The reported values represent the average of three samples.

Rate of Strength Buildup

Six aluminum test panels measuring 10.2 cm long by 2.5 cm wide by 1.6 mm thick ((4 inches by 1 inch by 0.063 inch) were cleaned and bonded as described above in the Overlap Shear Adhesion Test Method with the following modification. Spacer beads having a diameter of between 0.08 and 0.13 mm (0.003 and 0.005 inches) were used to control the bond line thickness. The bonded test panels were held at room temperature (23° C. or 73.4° F.) and evaluated for overlap shear strength at periodic intervals from the time the bonds were made.

Tensile Test According to DIN EN ISO 527

Tensile Test for the determination of the elongation at break of the uncured structural adhesive film.

Sample Preparation:

For the preparation of tensile-elongation experiments, the readily mixed curable compositions were transferred into a single-use syringe in such a way, that air entrapments were prevented. Subsequently, the reactive mass was transferred into a negative mold made from PTFE by injection. The mold was machine drilled to the specimen dimensions given in DIN EN ISO 527-2:2012 under 1A on page 7. The curable compositions were allowed to cure for seven days at 23° C. (73.4° F.) before the mold was opened and the specimen were removed.

Sample Testing:

The tensile test was performed on a tensile testing machine Zwick Z050 bearing a 50 kN (11,240 lbs) load cell, which was equipped with self-tightening clamping jaws. The specimen was clamped in the jaws of the tensile machine, with a gap of $L_0$=115 mm (4.53 inches), the upper jaw first, followed by the lower one. The testing speed was 10 mm/min (0.394 inches/min). For the monitoring of the elongation of the specimen, an extensometer was used which was set to a measuring length of 50 mm (1.97 inches). The end of the measurement was set to the point where the current force measured by load cell has reached 94% of the maximum force ($F_{max}$) measured so far. At this point, the maximum elongation ($e_{max}$) was recorded as $e_{max}=DL_0/L_0$ and the maximum tensile stress as $s=F_{max}/A$ (with A=4 mm*10 mm=40 $mm^2$ for DIN EN ISO 527-1A specimen). Additionally, in the early stages of the measurement, the tensile modulus was determined as $E_t=(s2-s1)/(e2-e1)$ with e1=0.05% and e2=0.25% as well as s1 and s2 being the stress values measured at e1 and e2 respectively.

EXAMPLES

Example 1: Table 2 below is based on using two Part As formulated to have a different Work Life (WL). One has a short 2 minute WL and the other has a longer 60 minute WL. The average weight % of the catalyst or accelerator in each Part A is used to control the working life of the structural adhesive formed using it. The average catalyst level based on volumetrically mixing different amounts of the two Part As will control the Working Life of a final structural adhesive formed therefrom. These two different Part A formulations could easily be blended together volumetrically to give a specific WL based on the desired application requirements from 2 minutes to 60 minutes. Once blended and mixed thoroughly, the Part B could be volumetrically dispensed and mixed with the blended Part A using an Automated, Robotic Dispensing Equipment.

TABLE 2

Volumetric Blending of Two Part As to Affect Work Life
Volumetric Blending Part A to Customize Work Life

| Part A (2 min Work Life) | Part A (60 min Work Life) | Two Part Adhesive Estimated Work Life (minutes) |
|---|---|---|
| 100% | 0% | 2 |
| 90% | 10% | 7.8 |
| 80% | 20% | 13.6 |
| 70% | 30% | 19.4 |
| 60% | 40% | 25.2 |
| 50% | 50% | 31 |
| 40% | 60% | 36.8 |
| 30% | 70% | 42.6 |
| 20% | 80% | 48.4 |
| 10% | 90% | 54.2 |
| 0% | 100% | 60 |

Example 2

Preparatory Examples

About 300 g (0.66 lbs) of the acrylate-based master batches of accelerators (ACMBA) used here were produced by slowly adding the respective acrylate to the full amount of 1-(2-Aminoethyl) piperazine (AEP) while stirring using a blade stirrer in a 500 mL (0.528 quart) glass container. The addition was conducted in such way, that the overall temperature of the ACMBA was not exceeding 40° C. (104° F.). At the end of the acrylate addition, the mixture was stirred for 60 minutes at room temperature to ensure the full conversion of the reactants.

TABLE 3

Preparation of different ACMBA from AEP and the respective acrylates

| | acrylate type | acrylate amount (grams) | AEP (grams) |
|---|---|---|---|
| ACMBA349 | SR349 | 193.39 | 106.61 |
| ACMBA351 | SR351 | 130.01 | 169.99 |
| ACMBA602 | SR602 | 225.15 | 74.85 |
| ACMBA9035 | SR9035 | 213.55 | 86.45 |

Examples

To prepare the described two-part (2K) curable compositions, the amounts and type of ACMBA, as given in Table 4, were combined in a 150 mL (0.159 quart) plastic cup and then mixed using a Hauschild SpeedMixer DAC 150.1 FVZ at 3500 rpm for 1 minute to yield thoroughly mixed material.

TABLE 4

Preparation of curable compositions from epoxy resin and ACMBA

| | Epikote 828 (grams) | ACMBA type | Amount of ACMBA (grams) |
|---|---|---|---|
| Example 1 | 30.69 | SR349 | 29.31 |
| Example 2 | 37.52 | SR351 | 22.48 |
| Example 3 | 25.42 | SR602 | 34.58 |
| Example 4 | 27.55 | SR9035 | 32.45 |
| Example 5 | 30.00 | SR349/SR602 | 12.50/17.50 |
| Example 6 | 31.80 | SR351/SR9035 | 9.41/18.82 |

TABLE 5

Results of tensile testing following DIN EN ISO 527

| | tensile modulus Et [MPa] | tensile stress s [MPa] | max. elongation e [%] |
|---|---|---|---|
| Example 1 | 3577 | 23.9 | 0.7 |
| Example 2 | 3410 | 43.7 | 1.3 |
| Example 3 | 230 | 14.3 | 55.0 |
| Example 4 | 6 | 3.52 | 57.3 |
| Example 5 | 1300 | 25.3 | 1.5 |
| Example 6 | 1550 | 35.5 | 2.3 |

What is claimed is:

1. A system for dispensing an adhesive, the system comprising:

a chamber that holds at least two flexible containment vessels, the at least two flexible containment vessels holding at least a part 1 and a part 2;

at least two adhesive delivery channels, a first adhesive delivery channel connected to the containment vessel to receive part 1 and a second adhesive delivery channel connected to the containment vessel to receive part 2;

a motor;

at least a first variable positive displacement pump wherein the first variable positive displacement pump is actuated by the motor; and a mixing tip designed to receive part 1 and part 2 from the at least two adhesive delivery channels, mix at least part 1 and part 2 together and dispense the adhesive through a dispensing end, wherein when in operation, the at least part 1, part 2, or mixtures thereof are only in contact with the at least two flexible containment vessels, the at least two adhesive delivery channels and the mixing tip, wherein the at least one variable positive displacement pump forces the at least part 1 and at least part 2 respectively through the first adhesive delivery channel and the second adhesive delivery channel to the dispensing end of the mixing tip, wherein the first adhesive delivery channel and the second adhesive delivery channel comprise a first and a second tube respectively upon which the at least first variable positive displacement pump acts, wherein the relative ratios of inner diameters of the first and second tubes are different.

2. The system according to claim 1 further comprising a compressive element configured to apply external positive pressure to the at least two flexible containment vessels in the chamber to force the part 1 and part 2 from the at least two flexible containment vessels through the adhesive delivery channel.

3. The system according to any of claims 1, wherein the chamber holds more than two flexible containment vessels, or even four flexible containment vessels.

4. The system according to any of claims 1, wherein the chamber further comprises an outlet manifold, wherein the at least two flexible containment vessels are fluidly connected to the outlet manifold.

5. The system according to claim 4 further comprising a compressive element that applies uniform pressure over the entire surfaces of the at least two flexible containment vessels.

6. The system according to claim 5, wherein the amount of pressure applied and dimensions of the outlet manifold are designed so that negative pressure is not needed to meter and flow part 1 and part 2 from the first and second flexible containment vessels.

7. The system according to claim 1, the chamber further comprising pressure transducers to control and maintain desired pressure in the chamber during use of the system.

8. The system according to claim 1, wherein the relative ratios of the inner diameters of the first and second tubes are configured to be changeable to allow for different ratios of part 1 and part 2, respectively.

9. The system according to claim 1, wherein outer wall thicknesses of the first and second tubes are constant.

10. The system according to claim 1, wherein outer wall thicknesses of the first and second tubes vary.

11. A system according to claim 1, wherein the first and second tube always have at least one section completely squeezed shut to prevent back flow during operation of the at least first variable positive displacement pump.

12. The system according to claim 1, wherein dispensing is prevented when the pump is not acting upon the first and second tube.

13. A system according to claim 1, wherein the first and second tubes are constrained by a first and second tube holder in the at least first variable positive displacement pump when acted upon by the pump.

14. A system according to claim 1, wherein the first and second tubes are acted upon by a compression element.

15. A system according to claim 1, further comprising a second variable positive displacement pump to act on the second adhesive delivery channel.

16. The system according to claim 15, wherein a metering element controls the first and the second variable positive displacement pumps and the metering element is controlled by an electronic processor.

17. A system according to claim 1, wherein the variable positive displacement pump(s) are a linear peristaltic pump.

18. A system according to claim 17, wherein the linear peristaltic pump comprises a cam shaft driven by the motor through the center of a housing that rotates to actuate moving elements within, wherein the cam shaft of the linear peristaltic pump acts on the tube(s).

19. A kit for dispensing multipart structural adhesives, the kit comprising:

a system according to claim 1; and at least a first flexible containment vessel holding a Part 1 composition and a second flexible containment vessel holding a Part 2 composition of a multipart structural adhesive, wherein the amounts, ratios, or both of the Part 1 and the Part 2 are controlled by the dispenser, and wherein the amounts, ratios, or both of the Part 1, and the Part 2 affect one or more properties of the multipart structural adhesive composition.

* * * * *